United States Patent
Matsuda et al.

(10) Patent No.: US 8,288,903 B2
(45) Date of Patent: Oct. 16, 2012

(54) STATOR OF ROTARY ELECTRIC MOTOR AND FUEL PUMP

(75) Inventors: Tatsuhisa Matsuda, Kariya (JP); Futoshi Abe, Toyota (JP); Kazumichi Hanai, Nagoya (JP); Hiroaki Naito, Inazawa (JP); Atsushi Sugimoto, Obu (JP); Fusatomo Miyake, Kasugai (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 172 days.

(21) Appl. No.: 12/841,220

(22) Filed: Jul. 22, 2010

(65) Prior Publication Data
US 2011/0020154 A1   Jan. 27, 2011

(30) Foreign Application Priority Data
Jul. 23, 2009   (JP) .................................. 2009-172134

(51) Int. Cl.
*H02K 11/00*   (2006.01)
*H02K 1/04*   (2006.01)
*F04B 17/00*   (2006.01)

(52) U.S. Cl. ........................ 310/71; 310/43; 417/410.1

(58) Field of Classification Search .................... 310/71, 310/43, 216.007, 214; 29/596
See application file for complete search history.

(56) References Cited

U.S. PATENT DOCUMENTS

| | | | |
|---|---|---|---|
| 5,859,486 A * | 1/1999 | Nakahara et al. | 310/216.004 |
| 7,098,565 B2 * | 8/2006 | Lee | 310/194 |
| 7,196,443 B2 * | 3/2007 | Kimura et al. | 310/71 |
| 7,378,768 B2 * | 5/2008 | Ohkawa et al. | 310/71 |
| 7,560,839 B2 * | 7/2009 | Sumiya et al. | 310/71 |
| 2008/0106161 A1 * | 5/2008 | Matsuzaki et al. | 310/71 |
| 2008/0143203 A1 * | 6/2008 | Purvines et al. | 310/71 |

FOREIGN PATENT DOCUMENTS

| | | |
|---|---|---|
| CN | 201134702 | 10/2008 |
| JP | 08019196 | 1/1996 |
| JP | 09191588 | 7/1997 |
| JP | 10136589 | 5/1998 |

* cited by examiner

*Primary Examiner* — Quyen Leung
*Assistant Examiner* — Thomas Truong
(74) *Attorney, Agent, or Firm* — Dennison, Schultz & MacDonald

(57) ABSTRACT

A stator of a rotary electric motor has core segments. All or some of the core segments have terminal mounting members for mounting terminals to which coils are connected. The terminal mounting member and the bobbin for each of the core segments are molded by resin and integrated with the corresponding core segment.

15 Claims, 21 Drawing Sheets

US 8,288,903 B2

STATOR OF ROTARY ELECTRIC MOTOR AND FUEL PUMP

This application claims priority to Japanese patent application serial number 2009-172134, the contents of which are incorporated herein by reference.

BACKGROUND OF THE INVENTION

1. Field of the Invention

The present invention relates to a stator of a rotary electric motor and a fuel pump.

2. Description of the Related Art

A known stator of a rotary electric motor is disclosed in Japanese Laid-Open Patent Publication No. 9-191588. The stator disclosed in this publication is equipped with a plurality of core segments arranged in an annular fashion, coils wound around the core segments through the intermediation of bobbins, and terminals (pins) which are provided on the bobbins and to which the coils are connected. The bobbins are formed by mounting a plurality of bobbin segments to the core segments.

In order to assemble the stator disclosed in the above publication, it is necessary to perform a step of forming a plurality of bobbin segments, and a step of mounting the plurality of bobbin segments to the core segments. As a result, the number of components and the assembly man-hours are rather large, resulting in increase of cost.

Therefore, there is a need in the art for a stator of a rotary electric motor and a fuel pump which makes it possible to achieve reduction in production cost through reduction in the number of components and assembly man-hours.

SUMMARY OF THE INVENTION

A stator of a rotary electric motor has core segments. All or some of the core segments have terminal mounting members for mounting terminals to which coils are connected. The terminal mounting member and the bobbin for each of the core segments are molded by resin and integrated with the corresponding core segment.

DETAILED DESCRIPTION OF THE INVENTION

Figure 1:
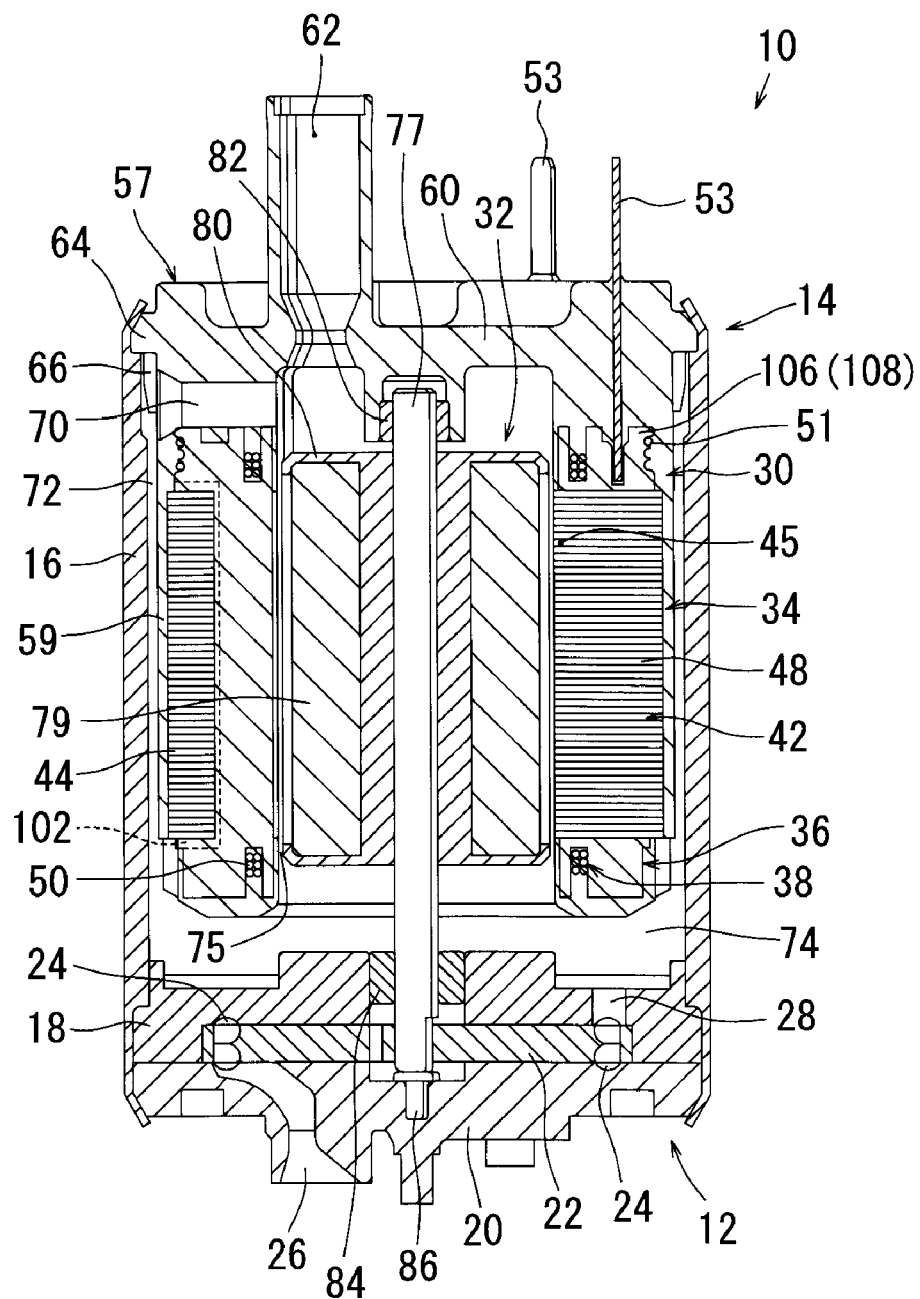
FIG. 1 is a sectional view as viewed from one lateral side of a fuel pump according to Example 1.

Each of the additional features and teachings disclosed above and below may be utilized separately or in conjunction with other features and teachings to provide improved stators of rotary electric motors and fuel pumps having such stators. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a stator of a rotary electric motor includes a plurality of core segments arranged in an annular fashion, a plurality of coils wound around the core segments via bobbins, a plurality of terminals connected to the coils, and a plurality of terminal mounting members to which the terminals are mounted. The bobbin and the terminal mounting member for each of the core segments are molded by resin and integrated with the corresponding core segment.

Therefore, it is possible to integrally form the bobbin and the terminal mounting member on the core segments by a single resin molding process. Thus, the number of components and assembly man-hours are reduced, thereby achieving reduction in production cost.

At least one thin thickness portion may connect the adjacent core segments to each other prior to molding the bobbin and the terminal mounting member for each of the core segments. This allows the plurality of core segments to be placed in a developed state, whereby it is possible to simultaneously form the bobbins and the terminal mounting members by resin molding on the plurality of core segments.

Alternatively, connection devices may pivotally connect the adjacent core segments to each other. The connecting devices are molded by resin and integrated with the respective core segments. Thus, it is possible to pivotally connect two adjacent core segments via the connection device. Further, it is possible to integrally form the connection devices on the core segments by a single resin molding process. The connection device may be a snap-fit device allowing engagement by utilizing elastic deformation of the resin.

The coils may be wound around the bobbins in a state in which the plurality of core segments are developed into a planar shape. Thus, the coil can be easily wound around each bobbin. After the winding operation, the plurality of core segments may be rounded into an annular shape.

Connection wire retaining members may each retain a connection wire between the coils for each phase during winding of the coils. Each of the connection wire retaining members is molded by resin and integrated with the corresponding core segment. Therefore, it is possible to separately retain the connection wire between the coils for each phase by the connection wire retaining member, making it possible to easily arrange the connection wire for each phase in an insulated state. Further, it is possible to integrally form the connection wire retaining member over the core segments by a single resin molding process.

A fuel pump equipped with the above-described stator enables reduction in production cost through reduction in the number of components and assembly man-hours.

Examples will now be described with reference to the drawings.

EXAMPLE 1

Figure 2:
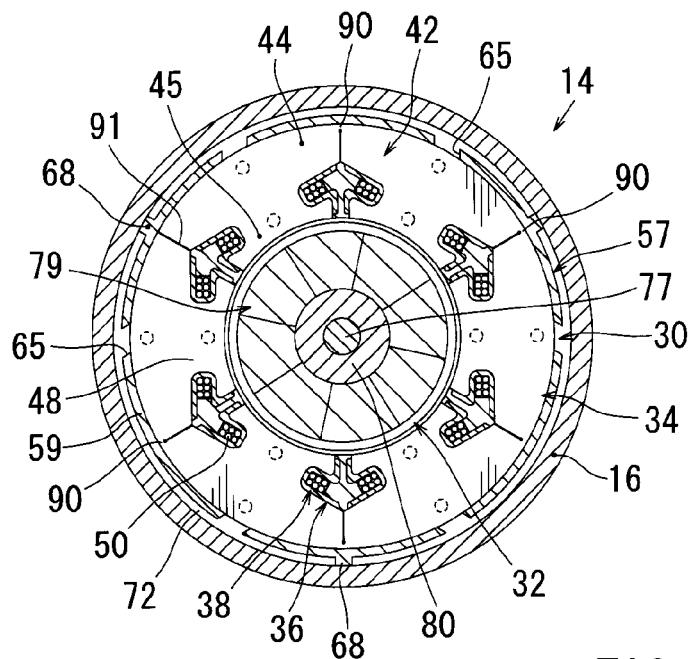
FIG. 2 is a plan sectional view of the fuel pump.

Example 1 will be described. For the sake of convenience in illustration, a fuel pump equipped with a stator of a rotary electric motor according to this example will be first described, and then a method of manufacturing the stator will be described. FIG. 1 is a sectional view as viewed from one side of a fuel pump, and FIG. 2 is a sectional view as viewed from an upper side of the same.

As shown in FIG. 1, a fuel pump 10 is an in-tank type fuel pump installed in a fuel tank of a vehicle, such as an automobile. The fuel pump 10 is equipped with a pump section 12 consisting of a Westco-type pump, and a motor section 14 driving the pump section 12. The pump section 12 and the motor section 14 are assembled within a housing 16. The housing 16 is formed of metal in a cylindrical tubular configuration. The pump section 12 is disposed within the lower portion of the housing 16, and the motor section 14 is disposed within the upper portion thereof. The motor section 14 serves as a "rotary electric motor".

The pump section 12 is equipped with a pump cover 18, a lower body 20, and an impeller 22. The pump cover 18 is press-fitted into the housing 16 from below, and is positioned with respect to the axial direction by being in contact with a stepped surface of the housing 16. Further, the lower body 20 is press-fitted into the housing 16 from below, and is positioned with respect to the axial direction by being in contact with the lower surface of the pump cover 18. The lower end portion of the housing 16 is crimped onto the lower body 20, so that the pump cover 18 and the lower body 20 are fixed to the housing 16.

The impeller 22 is rotatably accommodated between the pump cover 18 and the lower body 20. Between the pump cover 18 and the impeller 22, and between the lower body 20 and the impeller 22, pump paths 24 are formed to be symmetrical in a vertical direction. Further, the lower body 20 has a fuel suction port 26 communicating with the start end portion (the upstream side end portion) of the lower pump path 24 and open on the lower surface side. Further, the pump cover 18 has a communication port 28 communicating with the terminal end portion (the downstream side end portion) of the upper pump path 24 and open on the upper surface side. The pump cover 18 and the lower body 20 are formed, for example, of aluminum alloy. The impeller 22 is formed of a resin, such as polyphenylene sulfide (PPS).

Figure 3:
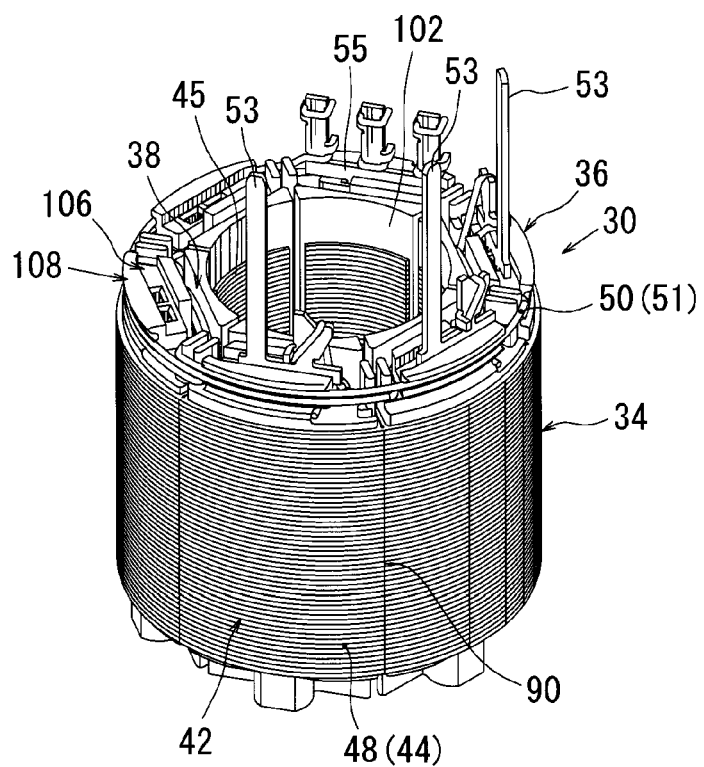
FIG. 3 is a perspective view of a stator.
Figure 4:
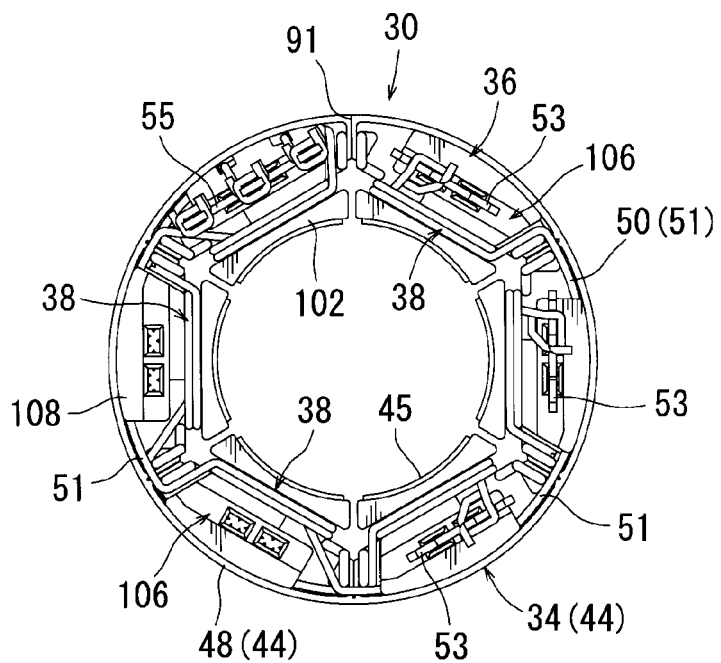
FIG. 4 is a plan view of the stator.

As shown in FIGS. 1 and 2, the motor section 14 is configured as a three-phase brushless DC motor of a 6-slot/8-pole inner rotor type. The motor section 14 includes a stator 30 and a rotor 32. The stator 30 includes a stator core 34, bobbins 36, and coils 38. FIG. 3 is a perspective of the stator, and FIG. 4 is a plan view of the same.

The stator core 34 (hereinafter referred to as the "core") is formed by six core segments 42 arranged in an annular fashion and in the circumferential direction (See FIG. 2). The core segments 42 respectively have yoke portions 44 arranged in an annular fashion, and magnetic pole teeth portions (hereinafter simply referred to as the "teeth portions") 45 protruding radially inwards (See FIGS. 3 and 4). A slot is formed between each two teeth portions 45 of the core segments 42 adjacent to each other in the circumferential direction. Each of the core segments 42 is constituted by a plurality of plate-like core members 48 formed of magnetic steel plates (e.g., silicon steel plates) stacked together in the axial direction (the vertical direction in FIG. 1) and joined together by mutual crimping. This will be explained later.

Each of the bobbins 36 is formed by resin molding so as to be integrated with the corresponding core segment 42. The bobbins 36 are formed of a resin material having an insulation property, and are each configured to expose the outer peripheral surface and opposite side end surfaces of the yoke portion 44 of the corresponding core segment 42 and to expose the inner peripheral surfaces of the teeth portions 45 while covering the remaining outer surface of the corresponding core segment 42. The bobbins 36 are formed of a resin material having an insulation property, such as polyacetal (POM), nylon (PA), or polyphenylene sulfide (PPS).

The coils 38 are formed by winding magnet wires 50 around the teeth portions 45 of the core segments 42 via the bobbins 36. The coils 38 of two core segments 42 arranged at an interval of 180 degrees are connected by a connection wire 51 of the magnet wires 50 (See FIG. 4). That is, two core segments 42 form one set, and a single magnet wire 50 is continuously wound over both teeth portions 45 (bobbins 36); there are combined three such sets. The three sets of the coils 38 form three-phase (U-phase, V-phase, and W-phase) coils, respectively. As shown in FIG. 4, the start end portions of the coils 38 of the three phases are electrically connected to three external connection terminals 53 provided at three adjacent bobbins 36 (described below). The terminal end portions of the coils 38 of the three phases are electrically connected to one neutral terminal 55 provided on the bobbin 36 arranged side by side with the bobbins 36 having the external connection terminals 53. As a result, the three-phase (U-phase, V-phase, and W-phase) coils 38 are connected in series in a Y-connection form, with two of them forming one set. The external connection terminals 53 and the neutral terminal 55 are formed of an electrically conductive material such as brass.

Figure 5:
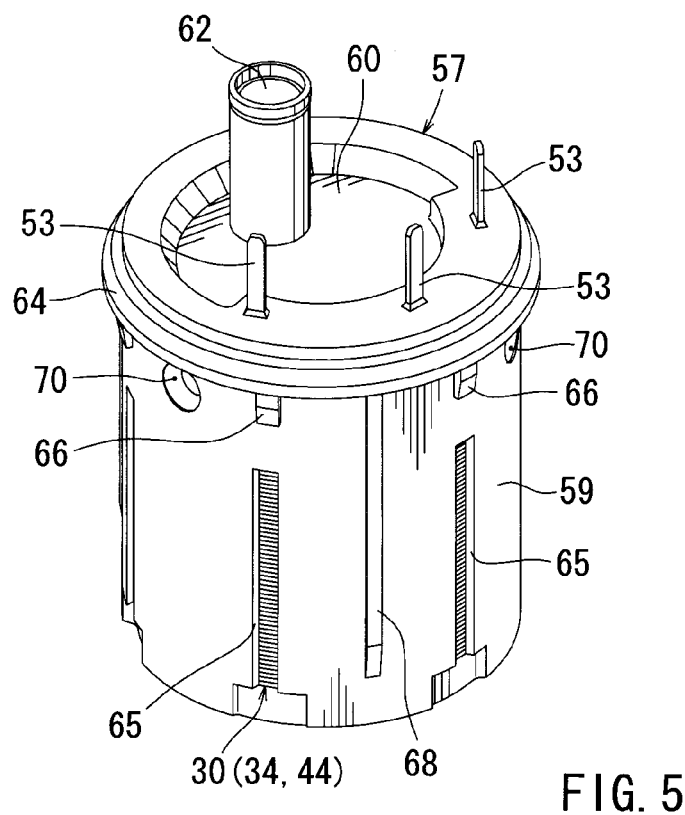
FIG. 5 is a perspective view of the stator formed integrally with an upper body of the fuel pump.

To assemble the stator 30 (See FIGS. 3 and 4) into the fuel pump 10 (See FIGS. 1 and 2), an upper body 57 is integrally formed on the stator 30 by a resin molding process. FIG. 5 is a perspective view of the stator 30 having the upper body 57 integrally formed.

As shown in FIG. 5, the upper body 57 has a cylindrical tubular peripheral wall portion 59, and an end wall portion 60 closing the upper open end of the peripheral wall portion 59 (See FIG. 1). The core 34, the bobbins 36, the coils 38, the external connection terminals 53 (more specifically, their base portions (lower portions)), and the neutral terminal 55 are embedded into the peripheral wall portion 59. Further, the peripheral wall portion 59 also fills the slots of the stator 30.

The upper portions of the external connection terminals 53 protrude from the end wall portion 60 (See FIG. 5). Further, a fuel discharge port 62 in the form of a hollow pipe is integrally formed on the end wall portion 60. The lower end portion of the fuel discharge port 62 is open at the lower surface, that is, into the hollow portion, of the peripheral wall portion 59 (See FIG. 1). An annular protrusion 64 is formed on the outer peripheral surface of the end wall portion 60. Further, in the outer side surface of the peripheral wall portion 59, there are formed, at equal circumferential intervals, six longitudinally elongated opening grooves 65 exposing the central portions in the circumferential direction of the yoke portions 44 of the core segments 42 (See FIGS. 2 and 5). Further, at the upper end portion of the outer peripheral surface of the peripheral wall portion 59, there are formed protrusions 66 situated under the protrusion 64 and above the opening grooves 65. Further, on the outer side surface of the peripheral wall portion 59, there are formed, at equal circumferential intervals, a predetermined number of (e.g., three) linear projections 68 extending in the axial direction (the vertical direction in FIG. 5) (See FIG. 2). Further, at the upper end portion of the peripheral wall portion 59, there are formed, at equal circumferential intervals, a predetermined number of (e.g., three, of which two are shown in FIG. 5) lateral holes 70 radially extending through the peripheral wall portion 59. The linear projections 68 and the lateral holes 70 are arranged alternately between the protrusions 66 adjacent to each other in the circumferential direction. The upper body 57 is formed of a resin material having an insulation property, such as polyacetal (POM), nylon (PA), or polyphenylene sulfide (PPS).

As shown in FIG. 1, the peripheral wall portion 59 of the upper body 57 is press-fitted into the housing 16 from above. The upper body 57 is positioned in the axial direction through contact of the protrusion 64 with the stepped surface of the housing 16. Further, by crimping the upper end portion of the housing 16 onto the upper end portion of the upper body 57, the upper body 57 is fixed to the housing 16. At the same time, the outer side surfaces of the protrusions 66 and the linear projections 68 of the upper body 57 are brought into face-to-face contact with the inner peripheral surface of the housing 16, whereby a gap 72 extending in the axial direction (the vertical direction) is formed between the housing 16 and the upper body 57. The upper end portion of the gap 72 communicates with the hollow portion of the upper body 57 via the lateral holes 70. The lower end portion of the gap 72 communicates with the communication port 28 via a space 74 defined between the upper body 57 and the pump cover 18. Further, the gap 72 forms a passage bypassing a magnetic circuit gap 75 between the stator 30 and the rotor 32 (described later), and the sectional area of the passage is set to be larger than the passage sectional area of the gap 75. Thus, the major portion of the fuel flowing within the motor section 14 flows through the gap 72. Thus, as compared with the case in which the passage defined by the magnetic circuit gap 75 is used as the fuel passage, it is possible to reduce the pressure loss of the fuel, allowing a large flow rate of the fuel.

As shown in FIGS. 1 and 2, the rotor 32 is rotatably provided in the hollow portion of the upper body 57 integrally formed with the stator 30. The rotor 32 has a rotation shaft 77, a cylindrical tubular permanent magnet 79, and a holder 80 coaxially retaining the permanent magnet 79 on the rotation shaft 77 in a fixed state. The upper and lower end portions of the rotation shaft 77 protrude beyond the upper surface and the lower surface of the holder 80, respectively. The upper end portion of the rotation shaft 77 is rotatably supported on the lower surface side of the end wall portion 60 of the upper body 57 via a bearing 82. The lower end portion of the rotation shaft 77 is rotatably supported by the pump cover 18 via a bearing 84. The protruding shaft portion of the rotation shaft 77 protruding downwards beyond the pump cover 18 is engaged with the impeller 22. Thus, the impeller 22 is rotated with the rotation of the rotor 32. Further, the protruding shaft portion of the rotation shaft 77 is supported in the thrust direction by a thrust bearing 86 provided in the lower body 20. At the same time, the teeth portions 45 of the core segments 42 of the stator 30 are opposed to the permanent magnet 79 through the intermediation of the magnetic circuit gap 75. The permanent magnet 79 is equipped with eight magnetic pole portions arranged in the circumferential direction (the rotating direction) (See FIG. 2). The eight magnetic pole portions are magnetized so as to form magnetic poles alternately different in the rotating direction on the outer peripheral surface sides thereof opposed to the teeth portions 45 of the core segments 42. While in this example the number of magnetic pole portions of the permanent magnet 79 is eight, by providing four magnetic pole portions, it is possible to form a motor section 14 consisting of a 6-slot/4-pole inner rotor type three-phase brushless DC motor without changing the construction of the stator 30. The rotation shaft 77 is formed, for example, of stainless steel. The bearings 82, 84 and 86 are formed, for example, of a copper based sintered alloy.

In a state in which the fuel pump 10 is installed in a fuel tank of a vehicle such as an automobile, the supply of current to the coils 38 is three-phase-full-wave-controlled according to the rotating position of the rotor 32 by an electronic control unit (ECU) (not shown), whereby the magnetic poles formed on the inner peripheral surfaces of the teeth portions 45 of the core segments 42 opposed to the magnetic pole portions of the permanent magnet 79 of the rotor 32 are switched. As a result, with the rotation of the rotor 32, the impeller 22 is rotated. Then, fuel in the fuel tank is drawn into the pump path 24 via the fuel suction port 26, and undergoes an increase in pressure in the pump path 24 before being supplied under pressure into the space 74 of the motor section 14 from the communication port 28. The fuel fed under pressure to the space 74 rises in the gap 72 between the housing 16 and the upper body 57, and is then discharged to the engine side (more specifically, the side of an injector) from a fuel discharge port 62 via the lateral holes 70 of the upper body 57 and the upper end portion of the hollow portion of the upper body 57.

Figure 6:
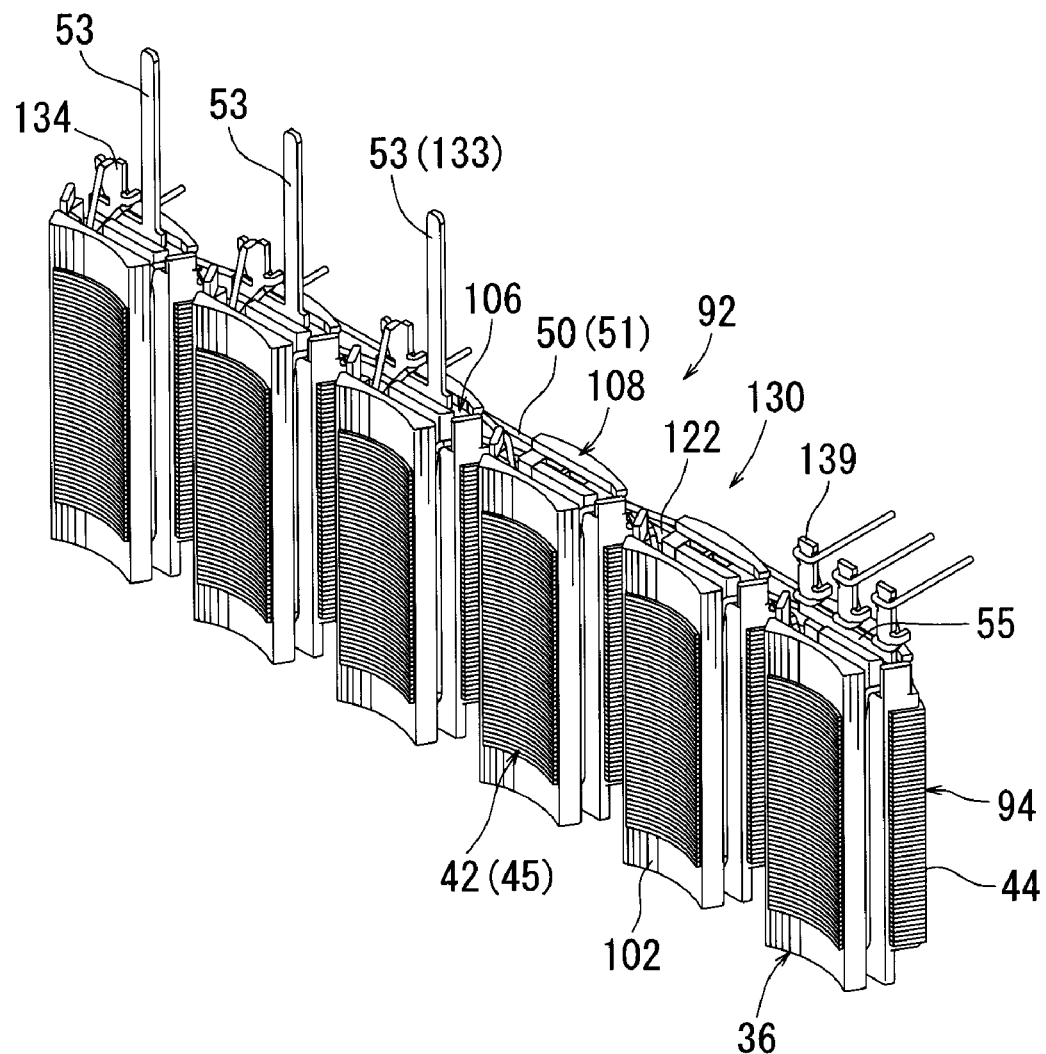
FIG. 6 is a perspective view showing a front side of an end intermediate product.
Figure 7:
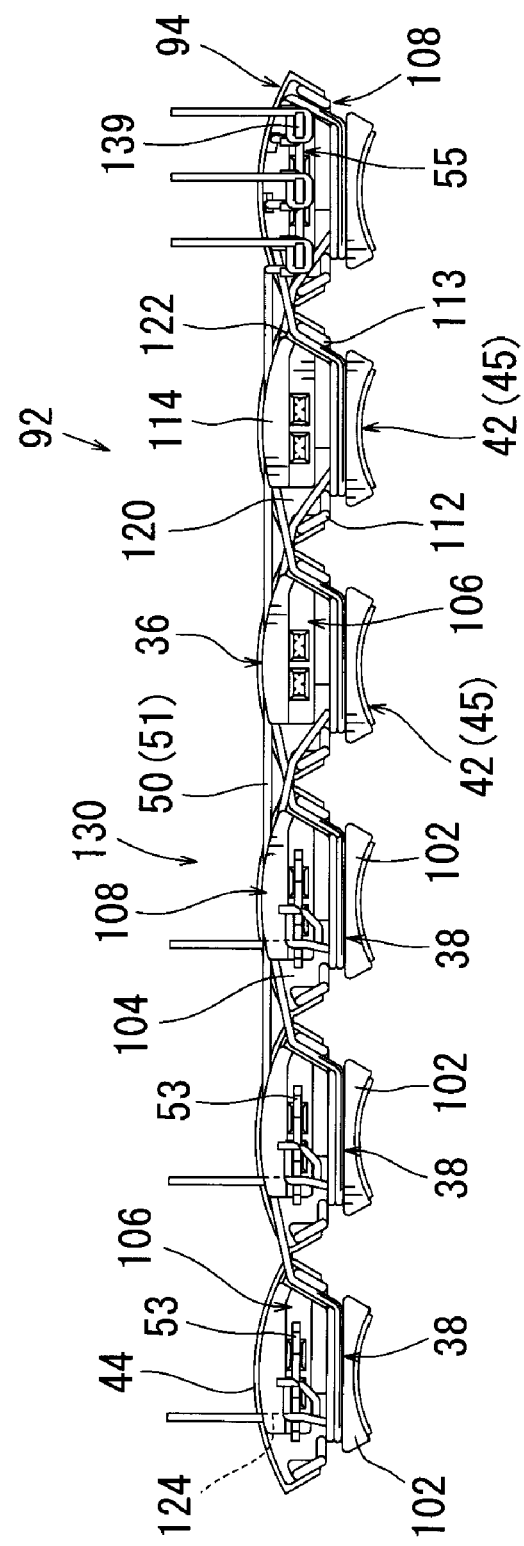
FIG. 7 is a plan view of the end intermediate product.
Figure 8:
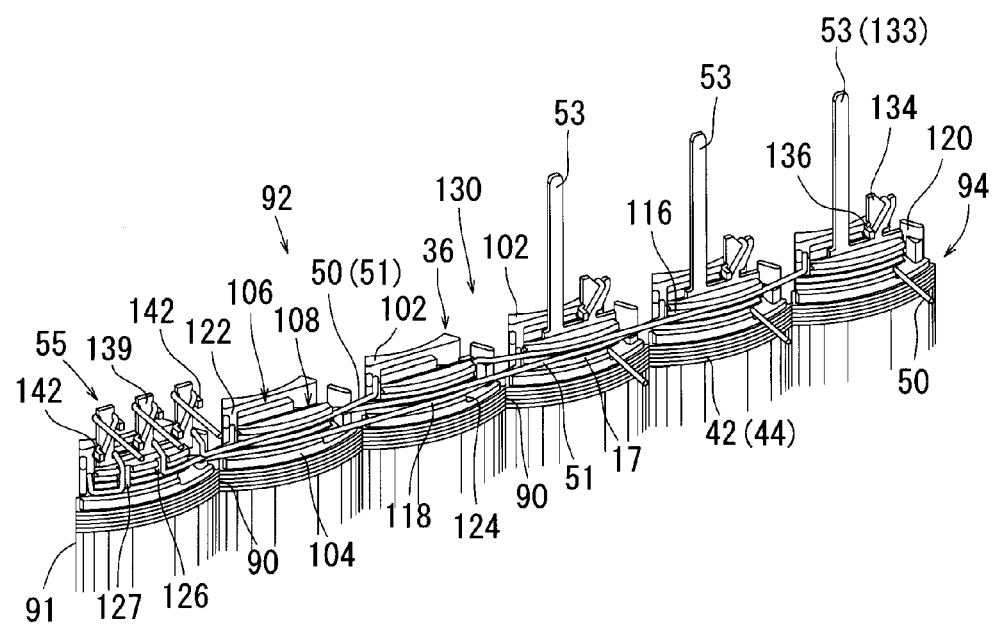
FIG. 8 is a perspective view showing a rear upper end portion of the end intermediate product.

Next, before describing a method of manufacturing the stator 30, a supplementary description of the stator 30 will be given. As shown in FIG. 2, at five of the six positions where the core segments 42 of the core 34 are adjacent to each other, the side end surfaces of the adjacent yoke portions 44 abut each other, with the outer circumferential ends of the yoke portions 44 of the core segments 42 being connected through the intermediation of thin-thickness portions 90, while at the remaining one position, the side end surfaces of the adjacent yoke portions 44 abut each other at a separation plane 91. Thus, it is possible to develop the stator 30 into a planar shape, with the six core segments 42 being connected together, through deformation of the thin-thickness portions 90 of the six core segments 42, with the result that the core segments 42 of the core 34 are aligned in a row. The stator 30 thus developed is referred to as an end intermediate product 92 (described later), and the core 34 in the developed state is referred to as a core segment row 94 (described later). FIG. 6 is a perspective view showing the front side of the end intermediate product 92, FIG. 7 is a plan view of the end intermediate product 92, and FIG. 8 is a perspective view of the rear upper end portion of the same. For the sake of convenience in illustration, regarding the end intermediate product 92, etc., the inner peripheral side is referred to as the front side, and the outer peripheral side is referred to as the rear side.

As shown in FIGS. 6 and 8, the end intermediate product 92 is obtained by performing several steps on the core segment row 94, which include the steps of resin molding the bobbins 36, mounting the external connection terminals 53 and the neutral terminal 55, and winding the magnet wires 50. And, the end intermediate product 92 is rounded into an annular configuration through deformation of the thin-thickness portions 90 (See FIG. 8) of the core segment row 94, whereby the stator 30 (See FIGS. 3 and 4) is obtained. For the sake of convenience in illustration, regarding the bobbins 36, the coils 38, and the core segments 42, they will be referred to as the first, second, third, . . . , and sixth ones as from the core segments 42 (on the left-hand side in FIG. 7) equipped with the external connection terminals 53 to the core segment 42 (on the right-hand side in FIG. 7) equipped with the neutral terminal 55.

Next, the steps of a method of manufacturing the stator 30 will be sequentially described.

(First Step)

Figure 9:
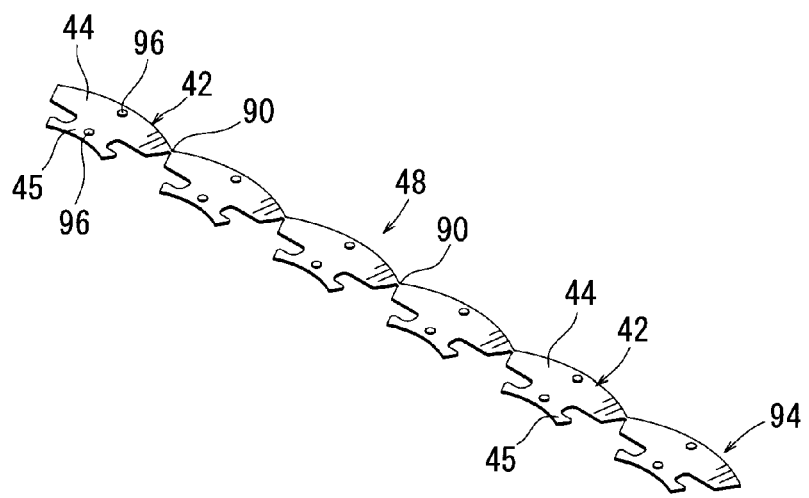
FIG. 9 is a perspective view of one of core members.

In the first step, the core member 48 is formed. FIG. 9 is a perspective view of the core member 48.

As shown in FIG. 9, the core member 48 is formed by punching from a material (not shown) consisting of a magnetic steel plate material (e.g., silicon steel plate material) by using a press machine. The core member 48 has a configuration corresponding to the configuration of the core segment row 94 as seen from above, with the core segments 42 having the yoke portions 44 and the teeth portions 45 being connected together in a row via the thin-thickness portions 90. Simultaneously with the punching operation, an embossing operation is effected on the core segments 42, whereby there are formed an appropriate number (two in FIG. 9) of round crimping portions 96 on each of the core segments 42. The crimping portions 96 are of a concave configuration on the lower surface side of the core member 48, and of a convex configuration on the upper surface side thereof. The thickness of the core member 48 is, for example, 0.35 mm. The number of the crimping portions 96 is not restricted to two; it may also be one or three or more.

Figure 10:
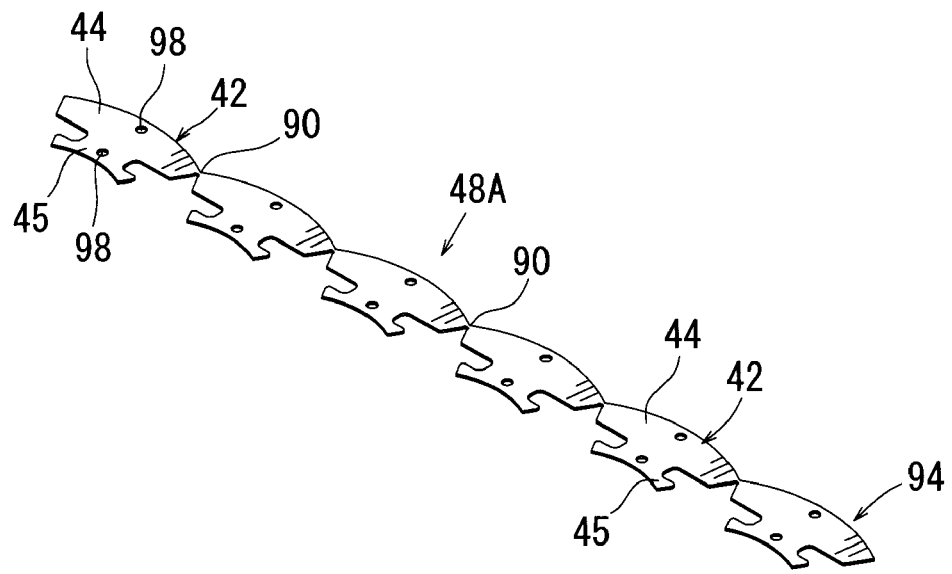
FIG. 10 a perspective view of an uppermost core member.

Apart from the core member 48, there is prepared an uppermost core member 48A of the core segment row 94. FIG. 10 is a perspective view of the uppermost core member 48A.

Figure 11:
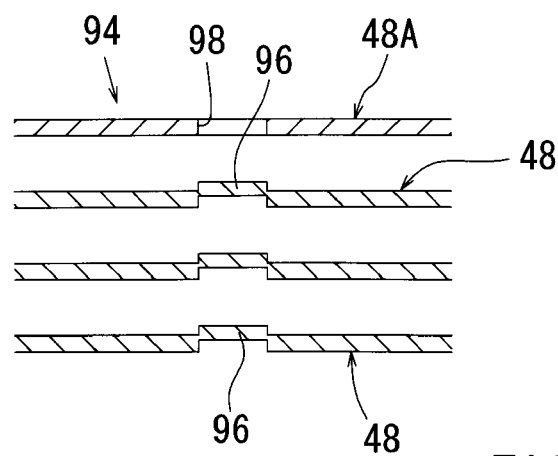
FIG. 11 is a sectional view showing the relationship between crimping portions of core members and a crimping hole portion of the uppermost core member.

As shown in FIG. 10, like the core member 48 (See FIG. 9), the uppermost core member 48A is formed by punching from a material (not shown) consisting of a magnetic steel plate material (e.g., silicon steel plate material). The basic configuration of the uppermost core member 48A is the same as that of the core member 48. Simultaneously with the punching operation, instead of the above-mentioned crimping portions 96, round crimping hole portions 98 are formed in the uppermost core member 48A. The crimping hole portions 98 are formed so as to be capable of being aligned with the crimping portions 96 of the core member 48. FIG. 11 is a sectional view showing the relationship between the crimping portions 96 of the core members 48 and the crimping hole portions 98 of the uppermost core member 48A.

(Second Step)

Figure 12:
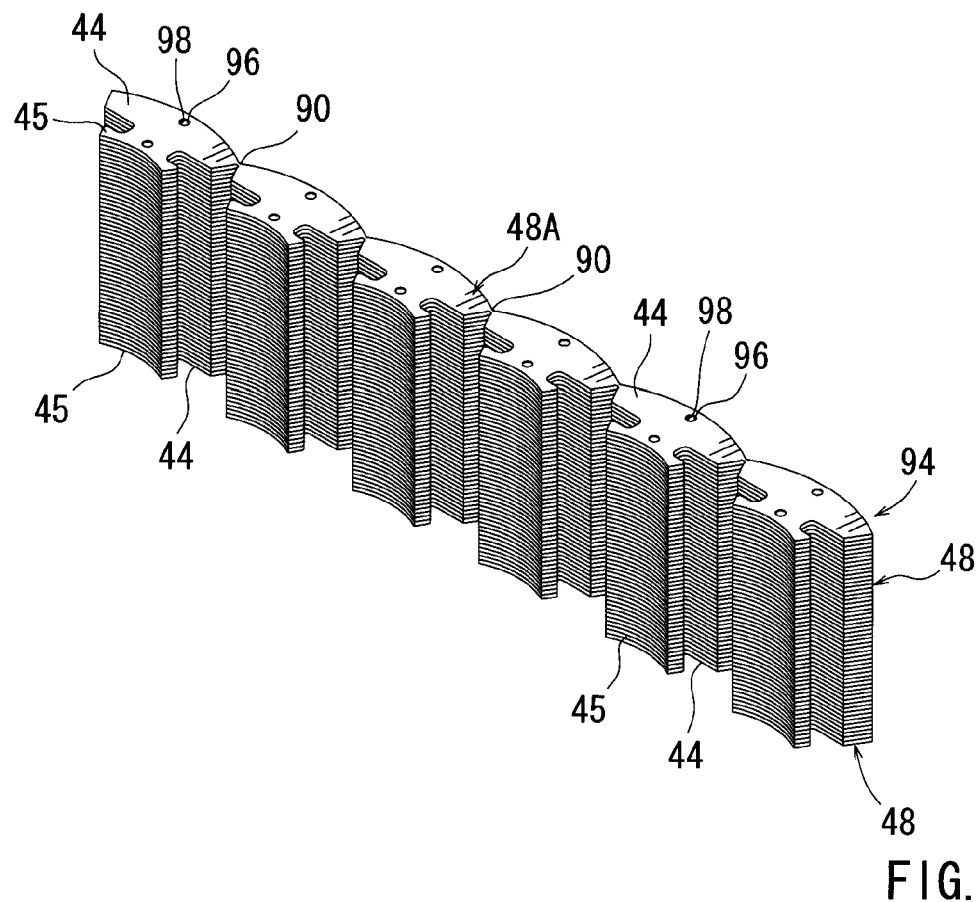
FIG. 12 is a perspective view of a core segment row.

In the second step, a plurality of core members 48 are assembled to be integrated. FIG. 12 is a perspective view of the core segment row, and FIG. 13 is a sectional view showing how the crimping portions 95 of the core member 48 of the core segment row and the crimping hole portions 98 of the uppermost core member 48A are crimped together.

Figure 13:
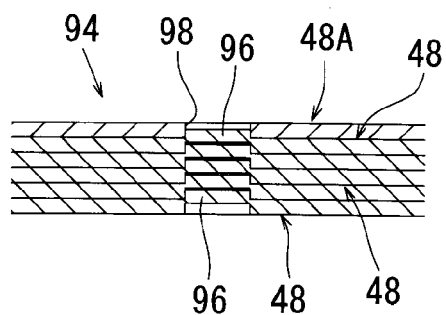
FIG. 13 is a sectional view showing how the crimping operation is effected by the crimping portions of core members of the core segment row and the crimping hole portion of the uppermost core member.

As shown in FIG. 12, a large number of (e.g., 80 to 100) core members 48 are stacked together in the vertical direction and are then pressed together, whereby the crimping portions 96 of the core members 48 vertically stacked together are crimped to each other (See FIG. 13). As a result, there is formed the core segment row 94, in which a plurality of core members 48 are integrated with each other. At this time, the uppermost core member 48A is stacked on the core segment row 94, and the crimping portions 96 of the second-stage core member 48 are crimped into the crimping hole portions 98 of the uppermost core member 48A. Thus, the crimping portions 96 of the second-stage core member 48 are accommodated in the crimping hole portions 98 of the uppermost core member 48A, whereby it is possible to prevent the crimping portions 96 from protruding from the upper surface of the core segment row 94. Thus, it is possible to prevent damage, etc. of the crimping portions 96 due to their protrusion from the upper surface of the core segment row 94, and to achieve an improvement in the handling property of the core segment row 94 (See FIG. 12).

(Third Step)

Figure 14:
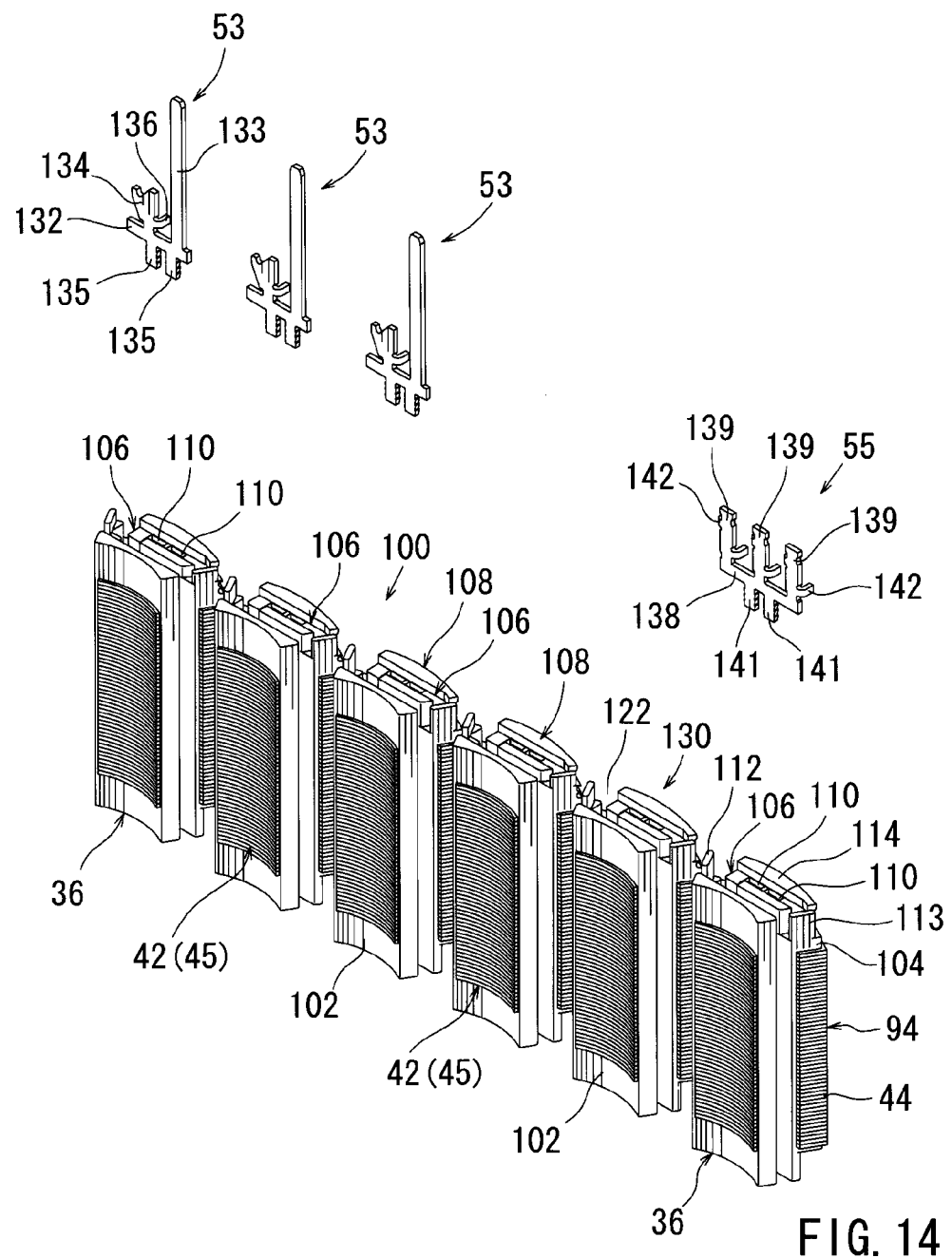
FIG. 14 is a perspective view showing the relationship between a first intermediate product, external connection terminals, and a neutral terminal.

In the third step, the bobbins 36 are integrally formed on the core segment row 94 through resin molding. The product obtained through resin molding of the bobbins 36 on the core segment row 94 is referred to as a first intermediate product. FIG. 14 is a perspective view showing the relationship between the first intermediate product, the external connection terminals, and the neutral terminal, FIG. 15 is a plan view of the first intermediate product, and FIG. 16 is a perspective view of the rear upper end portion of the same.

As shown in FIG. 14, the bobbins 36 are formed simultaneously and integrally on the core segments 42 of the core segment row 94 through resin molding, whereby a first intermediate product 100 is formed. The bobbins 36 are formed so as to expose the outer peripheral surfaces and the side end surfaces of the yoke portions 44 of the core segments 42, and the inner peripheral surfaces of the teeth portions 45 while covering the remaining outer surfaces (See FIGS. 15 and 16). Bobbin main portions 102 around which the coils 38 are wound are formed by the portions of the bobbins 36 surrounding the outer peripheral surfaces of the teeth portions 45 of the bobbins 36 and the portions thereof covering the inner peripheral surfaces of the yoke portions 44. A terminal mounting portion 106 and a connection wire retaining portion 108 are integrally formed on an upper end plate portion 104 covering the upper end surface of the yoke portion 44 of each bobbin 36 (See FIG. 15). The terminal mounting portion 106 is formed on the central portion of the upper end plate portion 104, and is equipped with a pair of right and left mounting recesses 110 having upper openings. The terminal mounting portion 106 may be called a "terminal mounting member".

Figure 15:
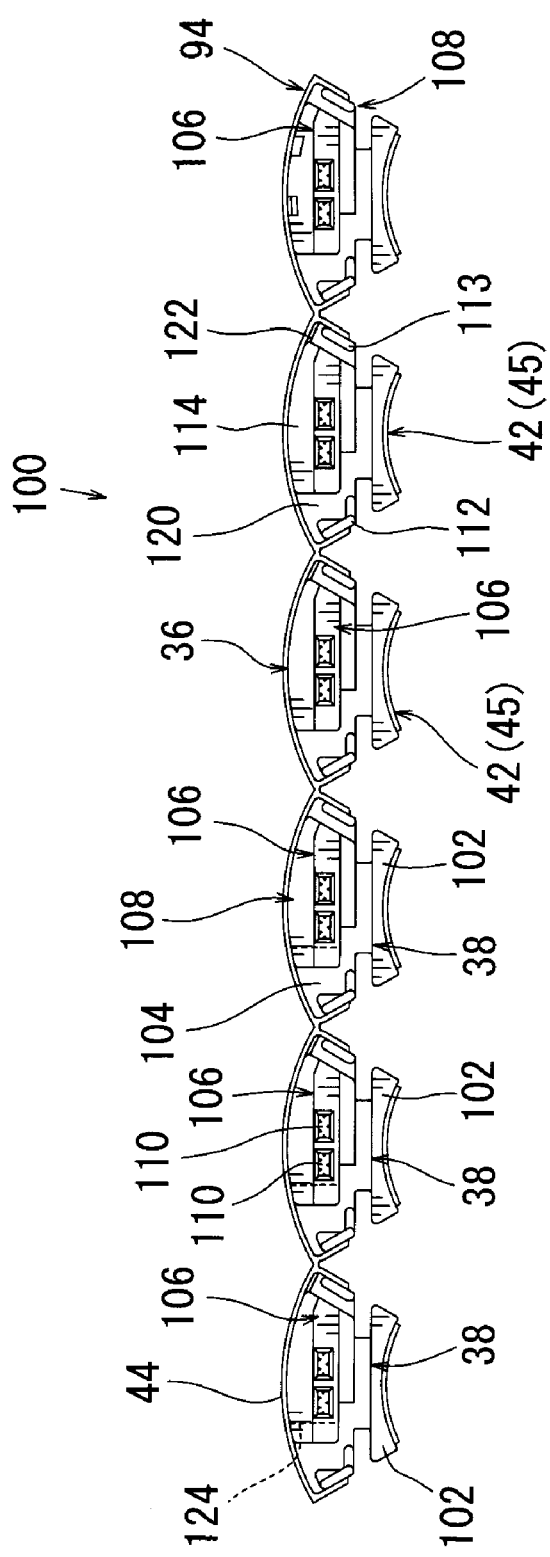
FIG. 15 is a plan view of the first intermediate product.
Figure 16:
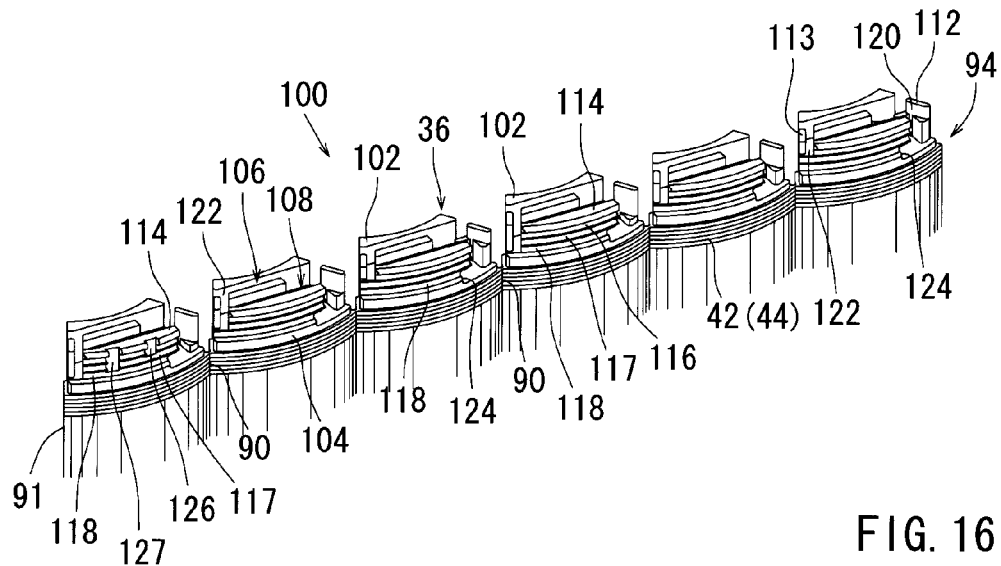
FIG. 16 is a perspective view of the rear upper end portion of the first intermediate product.

Each connection wire retaining portion 108 is equipped with opposite side wall portions 112 and 113 raised from the right and left end edges of the upper end plate portion 104, and an outer wall portion 114 raised from the outer peripheral edge (See FIG. 15). In the outer peripheral surface of each outer wall portion 114, there are formed upper, middle, and lower, i.e., three in total, laterally extending retention grooves 116, 117, and 118 (See FIG. 16). Further, between the side wall portions 112 and 113 and the outer wall portion 114, there are formed, in a symmetrical configuration, right and left guide grooves 120 and 122 that are opened upward. In each of the first and fourth bobbins 36, both guide grooves 120 and 122 are formed to be deep enough to allow their groove bottom portions to communicate with both end portions of the upper retention grooves 116; in the second and fifth bobbins 36, the groove bottom portions communicate with both end portions of the middle-stage retention grooves 117; and, in the third and sixth bobbins 36, the groove bottom portions communicate with both end portions of the lower-stage retention grooves 118; thus, the guide grooves are formed in different depths. Further, in the right-hand side half (the left-hand side half in FIG. 16) of each guide groove 120 on the left-hand side (the right-hand side in FIG. 16), the groove bottom portion is formed further deeper than the lower-stage retention groove 118, and, at the groove bottom portion thereof, there is formed a lateral groove 124 recessed to the right (to the left in FIG. 16). In the sixth bobbin 36, there are formed right and left vertical grooves 126 and 127. The left-hand side (the right-hand side in FIG. 16) vertical groove 126 extends from the middle-stage retention groove 117 to the upper end surface of the outer wall portion 114. The right-hand side (the left-hand side in FIG. 16) vertical groove 127 extends from the lower-stage retention groove 118 to the upper end surface of the outer wall portion 114. The connection wire retaining portions 108 may be called "connection wire retention members".

(Fourth Step)

In the fourth step, the external connection terminals 53 and the neutral terminals 55 are mounted to the first intermediate product 100.

As shown in FIG. 14, the three external connection terminals 53 and the three neutral terminals 55 are previously formed. The external connection terminals 53 are previously formed by punching from a conductive material such as brass. Each external connection terminal 53 has a horizontally elongated rectangular base portion 132, a terminal portion 133 extending straight from one end portion of the base portion 132, a knot-like entwining portion 134 formed at the other end portion of the base portion 132, and right and left leg portions 135 protruding downwardly from the base portion 132. On one side (terminal portion side) of the base end side of the entwining portion 134, there is formed a pin-like entwining portion 136 outwardly (rearwardly) bent into an L-shape.

The neutral terminal 55 is previously formed by punching from a conductive material. The neutral terminal 55 has a horizontally elongated rectangular base portion 138, left, center, and right, i.e., three in total, terminal portions 139 protruding from the base portion 138, and right and left leg portions 141 protruding downwardly from the base portion 138. On both sides of each terminal portion 139, there are formed pin-like entwining portions 142 that are staggered from each other and bent outwardly (rearwards) into an L-shape.

Figure 17:
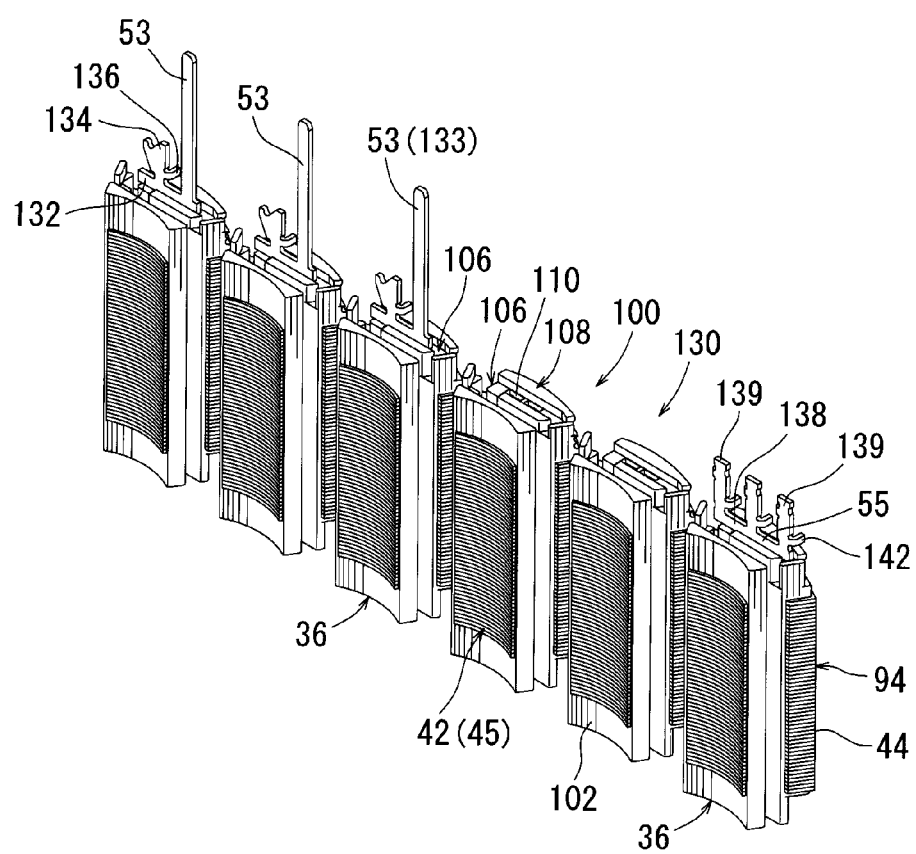
FIG. 17 is a perspective view of a second intermediate product.

The external connection terminals 53 and the neutral terminal 55 are mounted to the first intermediate product 100, whereby a second intermediate product (labeled with numeral 130) is formed. FIG. 17 is a perspective view of the second intermediate product, FIG. 18 is a plan view of the same, and FIG. 19 is a perspective view of the rear side upper end portion of the same.

Figure 18:
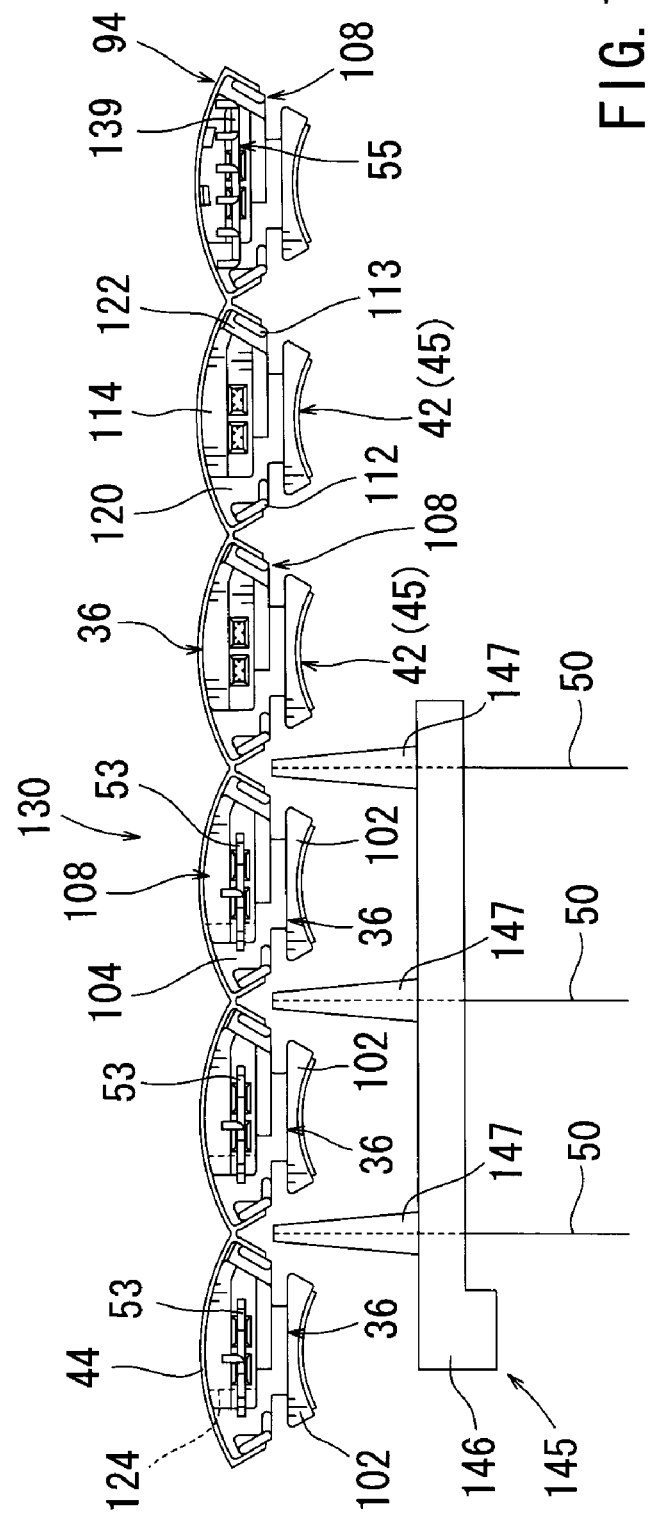
FIG. 18 is a plan view of the second intermediate product.
Figure 19:
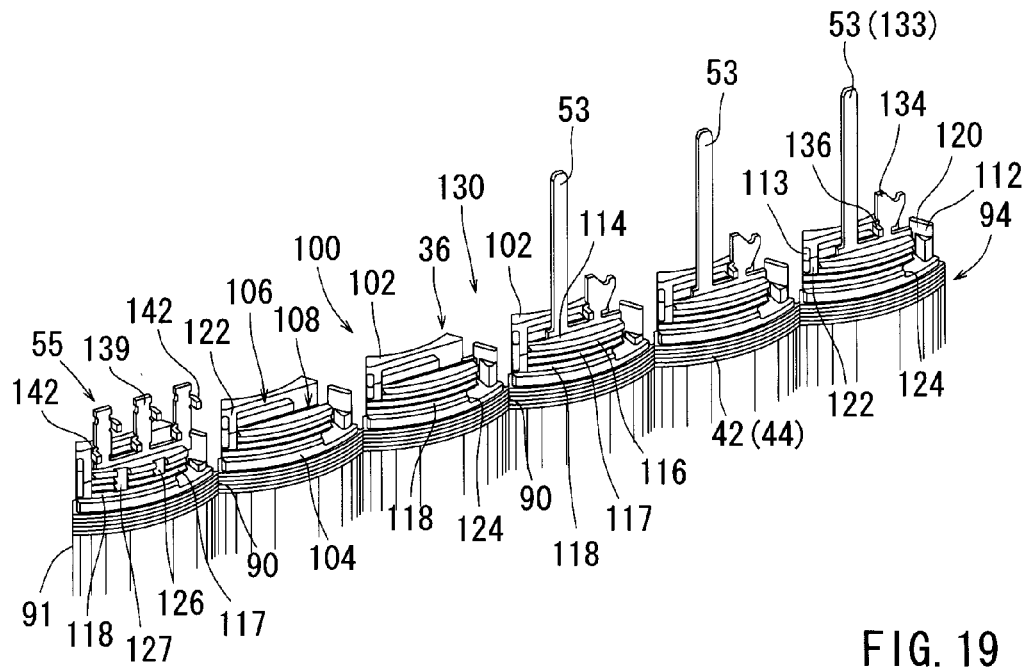
FIG. 19 is a perspective view showing the rear upper end portion of the second intermediate product.

As shown in FIGS. 17 through 19, in the second intermediate product 130, the external connection terminals 53 are respectively mounted to the first, second, and third bobbins 36 of the core segment row 94 by press-fitting both leg portions 135 (See FIG. 14) of each external connection terminal 53 into both mounting recesses 110 of the corresponding terminal mounting portion 106. The neutral terminal 55 is mounted to the sixth bobbin 36 of the core segment row 94 by press-fitting both leg portions 141 thereof (See FIG. 14) into both mounting recesses 110 of the corresponding terminal mounting portion 106.

(Fifth Step)

In the fifth step, the magnet wires 50 are wound around the second intermediate product 130.

As shown in FIG. 18, a winding device 145 for winding the magnet wires 50 is equipped with a nozzle stand 146 capable of moving in a predetermined direction. The nozzle stand 146 is equipped with right, center, and left, i.e., three in total, nozzles 147. The magnet wire 50 is fed out from each nozzle 147.

First, the start end portion of the magnet wire 50 drawn out of each nozzle 147 is entwined around the entwining portions 134 and 136 (See FIG. 17) of each of the external connection terminals 53. At this time, the start end portion of each magnet wire 50 is passed through the guide groove 120 on the left-hand side (the right-hand side in FIG. 8) of the connection wire retaining portion 108 and drawn out rearwards through the lateral groove 124 (See FIG. 8).

And, by rotating the nozzle stand 146 (See FIG. 18) around the axis of each bobbin main portion 102, the forward end portion of each nozzle 147 is swung along the bobbin main portion 102 of each of the first through third bobbins 36. As a result, the magnet wire 50 sent out from each nozzle 147 is wound around the bobbin main portion 102 of each bobbin 36 so as to form the first through third coils 38 (See FIG. 17).

Next, the nozzle stand 146 is moved rearwards so that the magnet wire 50 sent out from each nozzle 147 may be hooked on the guide groove 122 on the right-hand side of the connection wire retaining portion 108 of each of the first through third bobbins 36. Subsequently, the nozzle stand 146 is moved to the right to a position where the nozzles 147 are opposed to the left-hand end portions of the three adjacent core segments 42. Next, the nozzle stand 146 is moved forwards (downwards in FIG. 7) so that the magnet wire 50 sent out from each nozzle 147 may be hooked on the guide groove 122 on the left-hand side of the connection wire retaining portion 108 of each of the fourth through sixth bobbins 36. As a result, the connection wire 51 of the magnet wire 50 sent out from each nozzle 147 is retained in the retention grooves 116, 117, and 118 of each bobbin 36 (See FIG. 8). That is, the magnet wires 50 are distributed in the height direction according to the difference in depth between the guide grooves 120 and 122, and are arranged along the retention grooves 116, 117, and 118 according to the depths of the guide grooves 120 and 122. Thus, the connection wire 51 connecting the first and fourth bobbins 36 is retained in the upper-stage retention grooves 116 of the second and third bobbins 36. The connection wire 51 connecting the second and fifth bobbins 36 is retained in the middle-stage retention grooves 117 of the third and fourth bobbins 36. The connection wire 51 connecting the third and sixth bobbins 36 is retained in the lower-stage retention grooves 118 of the fourth and fifth bobbins 36.

And, by rotating the nozzle stand 146 again around the axis of each bobbin main portion 102, the forward end portions of the nozzles 147 are swung along the bobbin main portions 102 of the fourth through sixth bobbins 36. As a result, the magnet wire 50 sent out from each nozzle 147 is wound around the bobbin main portion 102 of each bobbin 36, whereby the fourth through sixth coils 38 are formed (See FIG. 7).

Next, the nozzle stand 146 is moved rearwards (upwards in FIG. 7) so that the magnet wire 50 sent out from each nozzle 147 may be hooked on the guide groove 122 on the right-hand side (the left-hand side in FIG. 8) of the connection wire retaining portion 108 of each of the fourth through sixth bobbins 36. And, the terminal end portion of each magnet wire 50 is entwined around each terminal portion 139 of the neutral terminal 55 by utilizing both entwining portions 142, and then the magnet wire is cut off. At this time, the upper-stage magnet wire 50 is entwined around the terminal portion 139 on the left-hand side (the right-hand side in FIG. 8) of the neutral terminal 55. The middle-stage magnet wire 50 passes through the left-hand side (the right-hand side in FIG. 8) vertical groove 126 from the middle-stage retention groove 117 of the connection wire retaining portion 108 of the sixth bobbin 36 before being entwined around the central terminal portion 139 of the neutral terminal 55. The lower-stage magnet wire 50 passes through the guide groove 120 on the left-hand side (the right-hand side in FIG. 8) of the connection wire retaining portion 108 of the sixth bobbin 36 and via the inner side of the terminal mounting portion 106; then, it passes through the guide groove 120 on the right-hand side (the left-hand side in FIG. 8) and through the right-hand side (the left-hand side in FIG. 8) vertical groove 127 from the lower-stage retention groove 118 before being entwined around the terminal portion 139 on the right-hand side (the left-hand side in FIG. 8) of the neutral terminal 55. Opposite end portions of each magnet wire 50 are welded to the entwining portion 134 of each external connection terminal 53 and each terminal portion 139 of the neutral terminal 55 by resistance welding or the like.

In the manner described above, the end intermediate product 92 (See FIGS. 6 through 8) is formed.

(Sixth Step)

In the sixth step, the end intermediate product 92 is rounded.

The end intermediate product 92 (See FIGS. 6 through 8) is rounded into an annular configuration through deformation of the thin-thickness portions 90 of the core segment row 94. As a result, there is formed the stator 30 in which the core segments 42 are arranged in an annular fashion (See FIGS. 3 and 4). At the same time, the side end surfaces of the yoke portions 44 of the adjacent core segments 42 are held in face-to-face contact with each other.

In the stator 30 manufactured by the manufacturing method described above, the bobbins 36 and the terminal mounting portions 106 are integrally formed with the core segments 42 through resin molding. Thus, it is possible to integrally form the bobbins 36 and the terminal mounting portions 106 on the core segments 42 by a single resin molding operation. Thus, the number of components and the assembly man-hours are reduced, thereby making it possible to achieve a reduction in production cost.

Further, prior to the resin molding, the adjacent core segments 42 are connected together via the thin-thickness portions 90. Thus, by placing the six core segments 42 in a developed state, it is possible to simultaneously form the bobbins 36 and the terminal mounting portions 106 by resin molding on the six core segments 42.

Further, in the state in which the six core segments 42 are developed in a planar fashion, the coil 38 is wound around each bobbin 36. Thus, the coil 38 can be easily wound around each bobbin 36. After the winding operation, it is only necessary to round the six core segments 42 into an annular configuration.

Further, the connection wire retaining portions 108, which separately retain the connection wires 51 between the coils 38 for each phase at the time of winding of the coils 38, are formed integrally with the core segments 42 through resin molding. Thus, due to the connection wire retaining portions 108, it is possible to separately retain the connection wires 51 between the coils 38 for each phase, making it possible to easily arrange the connection wires 51 for each phase in an insulated state. Further, the connection wire retaining portions 108 can be integrally formed on the core segments 42 by a single resin molding step.

Further, the above-described fuel pump 10 (See FIGS. 1 and 2) have the stator 30 which helps to achieve a reduction in production cost through a reduction in the number of components and the assembly man-hours.

EXAMPLE 2

Figure 20:
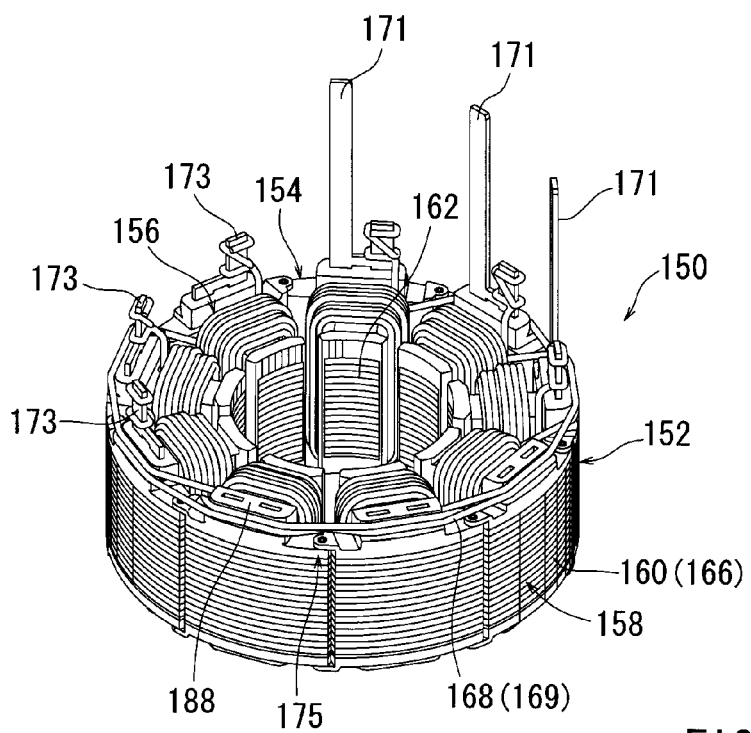
FIG. 20 is a perspective view of a stator according to Example 2.
Figure 21:
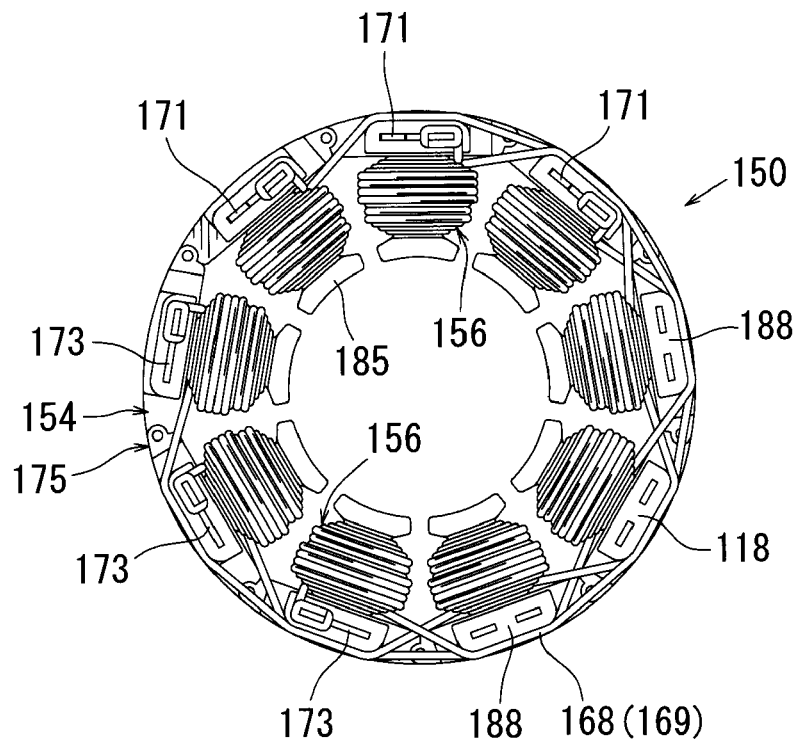
FIG. 21 is a plan view of the stator.
Figure 22:
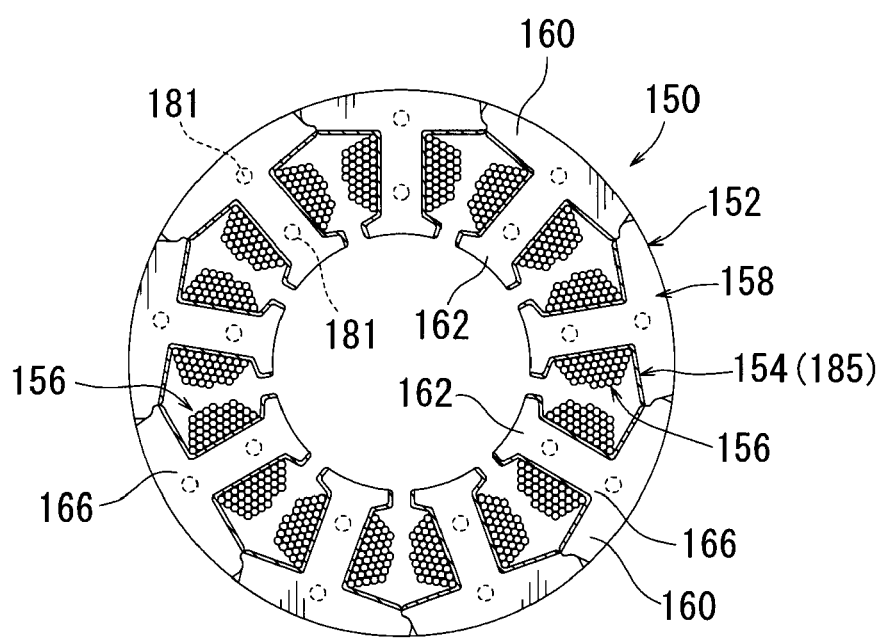
FIG. 22 is a plan sectional view of the stator.

Example 2 will now be described. This example is applied to a stator for use in a 9-slot/6-pole inner-rotor type three-phase brushless DC motor. FIG. 20 is a perspective view of a stator, FIG. 21 is a plan view of the same, and FIG. 22 is a sectional view as viewed from an upper sided of the same.

As shown in FIG. 20, a stator 150 is equipped with a core 152, bobbins 154, and coils 156. The core 152 is formed by arranging, in the circumferential direction and in an annular fashion, nine core segments 158 in total separated in the circumferential direction (See FIG. 22). The core segments 158 have yoke portions 160 arranged in an annular fashion, and teeth portions 162 protruding radially inwards from the yoke portions 160. Slots (which are not indicated by a reference numeral) are formed between the teeth portions 162 of the core segments 158 adjacent to each other in the circumferential direction. The core segments 158 are formed integrally through mutual crimping of plate-like core members 166 consisting of a number of magnetic steel plate members (e.g., silicon steel plate members) stacked together in the axial direction (the vertical direction in FIG. 20) as will be explained later.

The bobbins 154 are integrally formed with the core segments 158 through a resin molding process. The bobbins 154 are formed of a resin material having an insulation property, and are formed so as to expose the outer peripheral surfaces and the side end surfaces of the yoke portions 160 of the core segments 158 and the inner peripheral surfaces of the teeth portions 162 while covering the remaining outer surfaces of the core segments 158. The bobbins 154 are formed of a resin material having an insulation property, such as polyacetal (POM), nylon (PA), or polyphenylene sulfide (PPS).

The coils 156 are formed by winding magnet wires 168 around the teeth portions 162 of the core segments 158 through the intermediation of the bobbins 154. The coils 156 of the three core segments 158 arranged at an interval of 120 degrees are connected to each other via connection wires 169 of the magnet wires 168 (See FIG. 20). That is, three core segments 158 constitute one set, and one magnet wire 168 is continuously wound over both teeth portions 162 (bobbins 154); three such sets are combined. The three sets of coils 156 constitute three-phase (U-phase, V-phase, and W-phase) coils, respectively. As shown in FIG. 21, the start end portions of the coils 158 of the three phases are electrically connected to three external connection terminals 171 provided on three adjacent bobbins 154 (described below). The terminal end portions of the coils 156 of the three phases are electrically connected to three neutral terminals 173 provided on the three bobbins 154 that are provided side by side with the bobbins 154 having the external connection terminals 171. Further, the three neutral terminals 173 are electrically connected together via connection terminals (not shown). As a result, the coils 156 of the three phases (U-phase, V-phase, and W-phase) are Y-connected in series, with three coils forming one set. The external connection terminals 171 and the neutral terminals 173 are formed of a conductive material such as brass.

Figure 23:
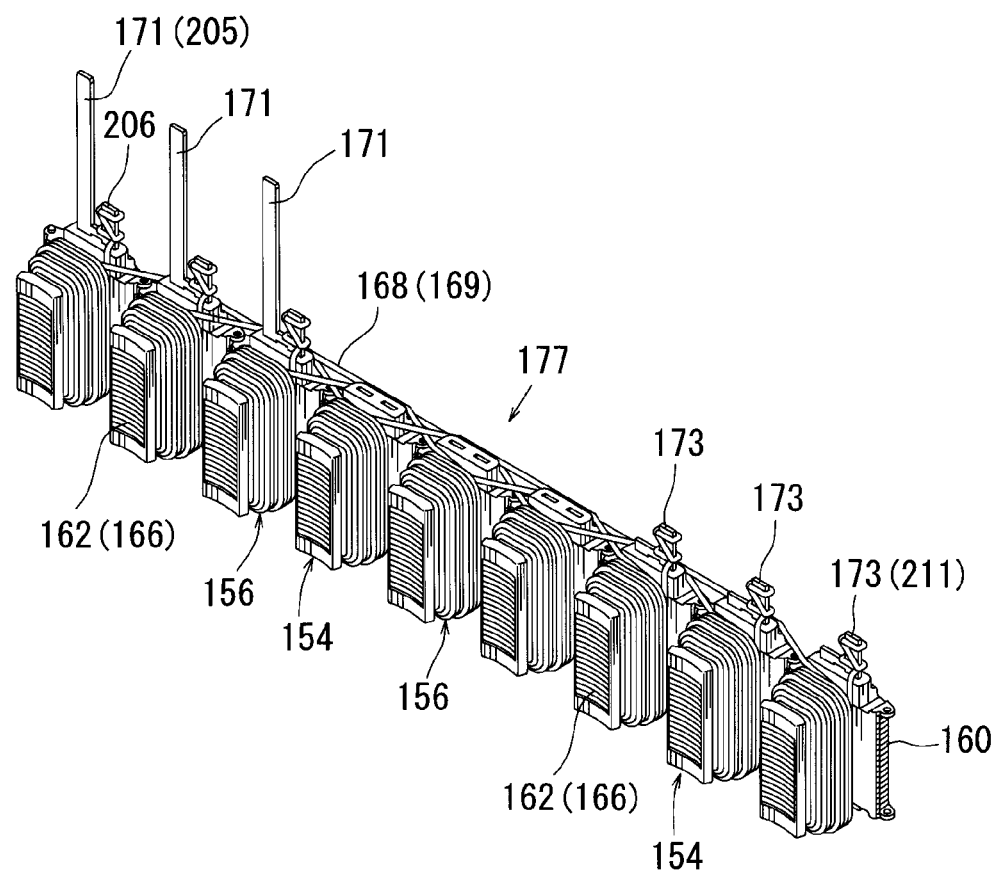
FIG. 23 is a perspective view showing the front side of an end intermediate product.
Figure 24:
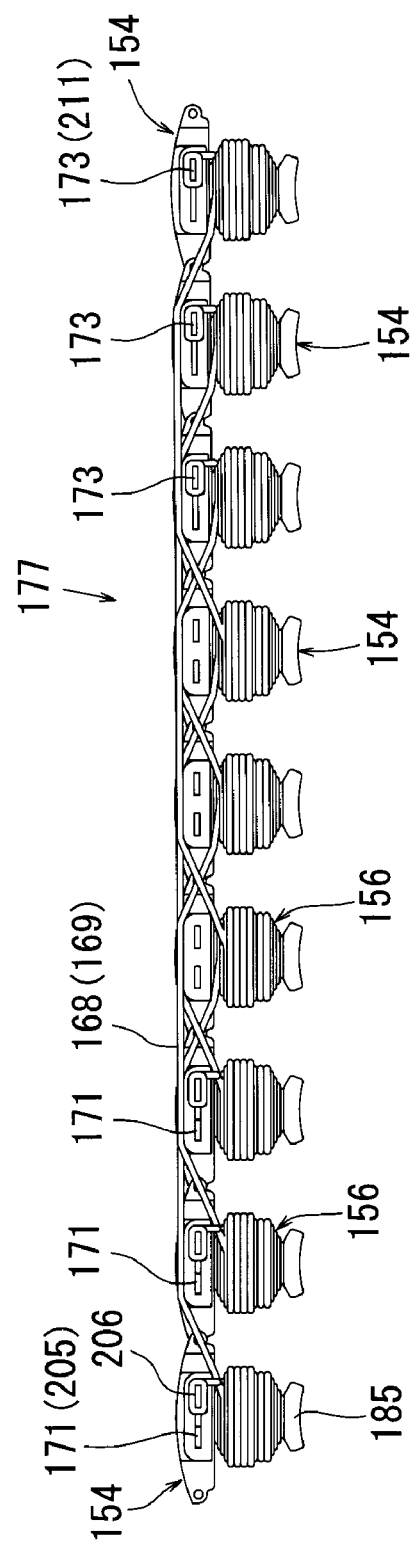
FIG. 24 is a plan view of the end intermediate product.

Next, prior to the illustration of a method of manufacturing the stator 150, a supplementary description of the stator 150 will be given. As shown in FIG. 21, in the core 152, the outer circumferential ends of the adjacent bobbins 154 are pivotally connected via connection units 175, and, in this state, the side end surfaces of the yoke portions 160 abut each other. Thus, by developing the stator 150 into a planar form through rotation at the connection units 175 of the nine bobbins 154, it is possible to attain a state in which the core segments 158 of the core 152 are aligned in a row. The stator 150 thus developed is referred to as an end intermediate product 177 (described later). FIG. 23 is a perspective view of the front side of the end intermediate product, and FIG. 24 is a plan view of the end intermediate product. For the sake of convenience in illustration, with regard to the end intermediate product 177, etc., the inner peripheral side will be referred to as the front side, and the outer peripheral side as the rear side.

As shown in FIGS. 23 and 24, the end intermediate product 177 is obtained by several steps including steps of resin molding the bobbins 154 on the core segments 158, connecting the nine bobbins 154, mounting the external connection terminals 171 and the neutral terminals 173, and winding the magnet wires 168. And, the end intermediate product 177 is rounded into an annular configuration through rotation at the connection units 175 of the bobbins 154, whereby the stator 150 (See FIGS. 20 through 22) is formed. In the end intermediate product 177 or the stator 150, the three neutral terminals 173 are electrically connected through connection terminals (not shown). For the sake of convenience in illustration, regarding the bobbins 154, the coils 156, and the core segments 158, they will be referred to as the first, second, third, . . . , and ninth ones from the left to the right side as seen in FIG. 24.

Next, the steps of a method of manufacturing the stator 150 will be described sequentially.
(First Step)

Figure 25:
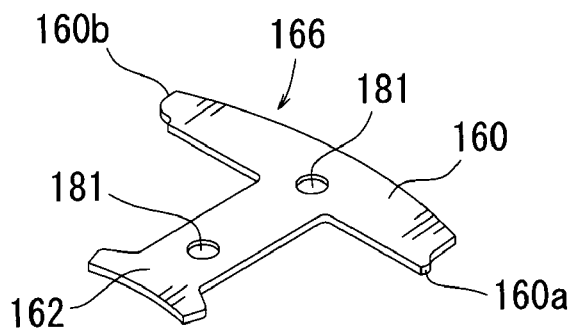
FIG. 25 is a perspective view of one of core members.

In the first step, core members 166 are formed. FIG. 25 is a perspective view of one of the core members 166.

As shown in FIG. 25, the core member 166 is formed by punching from a material (not shown) consisting of a magnetic steel plate material (e.g., silicon steel plate material) by using a press machine. The core member 166 has a configuration corresponding to the configuration of the core segment 158 as seen from above, and has a yoke portion 160 and a teeth portion 162. Simultaneously with the punching operation, embossing is performed on the core member 166, whereby there are formed an appropriate number (two in FIG. 25) of round crimping portions 181. The crimping portions 181 are of a concave configuration on the upper surface side of the core member 166, and of a convex configuration on the lower surface side thereof. Further, a protruding portion 160a is formed on the inner peripheral side of one (e.g., right-hand) side end surface of the yoke portion 160, and a recessed portion 160b is formed on the inner peripheral side of the other (e.g., left-hand) side end surface thereof. The thickness of the core member 166 is, for example, 0.35 mm. The number of crimping portions 181 is not limited to two; it may also be one or three or more.
(Second Step)

Figure 26:
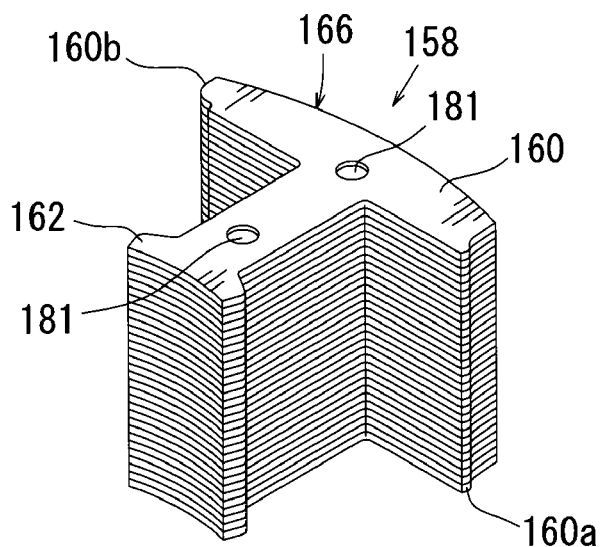
FIG. 26 is a perspective view of one of core segments.

In the second step, the core segment 158 is formed by integrating a plurality of core members 166. FIG. 26 is a perspective view of the core segment 158, and FIG. 27 is a sectional view illustrating how the core members of the core segments are crimpled together by virtue of the swaging portions.

Figure 27:
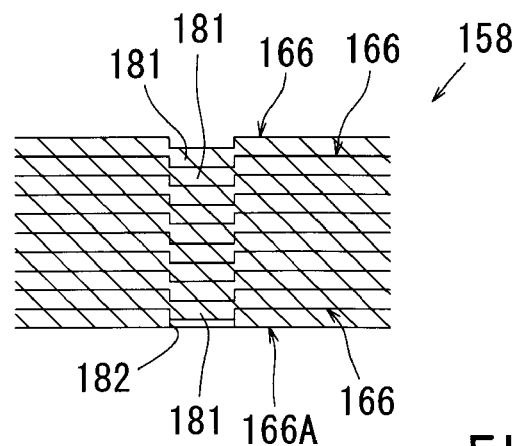
FIG. 27 is a sectional view illustrating how the crimping operation is effected by crimping portions of the core segment.

As shown in FIG. 26, a large number of (e.g., 80 through 100) core members 166 are stacked together in the vertical direction, and pressed, whereby the vertically stacked core members 166 are mutually crimped together at the crimping portions 181 (See FIG. 27). As a result, there is formed the core segment 158 in which a plurality of core members 166 are integrated with each other.

In this example also, apart from the core members 166, there is used a lowermost core member 166A in the core segment 158 (See FIG. 27). Like the core member 166, the lowermost core member 166A is formed by punching from a material (not shown) consisting of a magnetic steel plate material (e.g., silicon steel plate material) by using a press machine. The basic configuration of the lowermost core member 166A is of the same configuration as the core member 166, and, instead of the crimping portions 181, there are formed round crimping hole portions 182 simultaneously with the punching operation. And, the lowermost core member 166A is stacked on the lower surface side of the core segment 158, and the crimping portions 181 of the second lowest core member 166 are crimped into the crimping hole portions 182 of the lowermost core member 166A, so that the crimping portions 181 of the second lowest core member 166 are accommodated in the crimping hole portions 182 of the lowermost core member 166A. Thus, the crimping portions 181 are prevented from protruding from the lower surface of the core segment 158, whereby damage or the like of the crimping portions 181 is prevented, and the handling property of the core segment 158 can be improved.
(Third Step)

Figure 28:
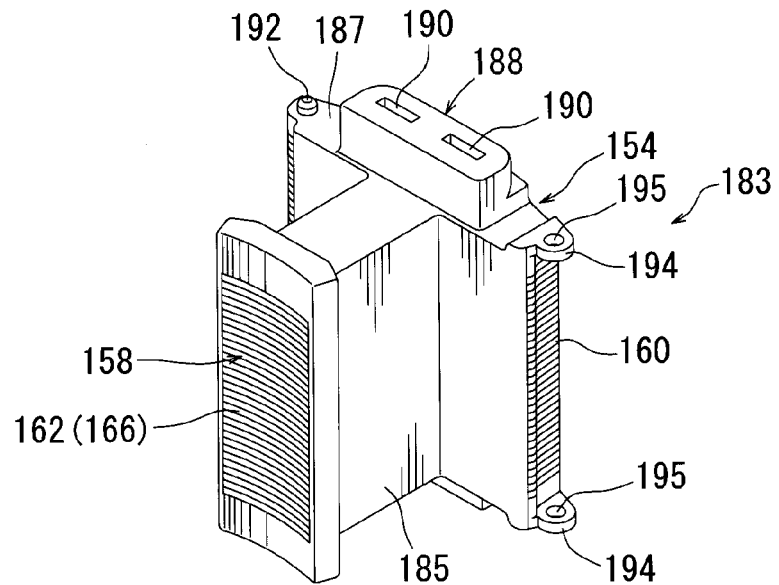
FIG. 28 is a perspective view of a first intermediate product.

In the third step, the bobbin 154 is integrally formed on the core segment 158 through resin molding. What is obtained through resin molding of the bobbin 154 on the core segment 158 is referred to as a first intermediate product 183. FIG. 28 is a perspective view of the first intermediate product, and FIG. 29 is a front view, partly in section, of the same.

Figure 29:
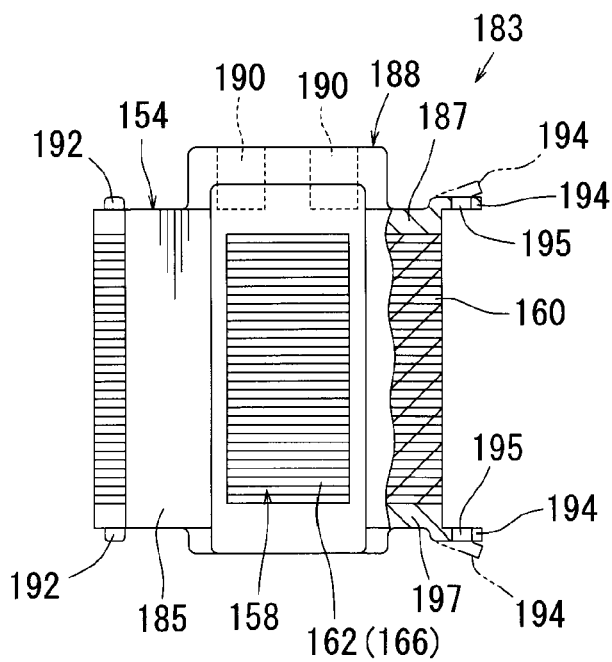
FIG. 29 is a front view, partly in section, of the first intermediate product.

As shown in FIGS. 28 and 29, the bobbin 154 is formed integrally on the core segment 158 through resin molding. The bobbin 154 is formed so as to expose the outer peripheral surface and both side end surfaces of the yoke portion 160 and the inner peripheral surface of the teeth portion 162 while covering the remaining outer surfaces of the core segment. A bobbin main portion 185 around which the coil 156 is wound is formed by the portion of the bobbin 154 surrounding the outer peripheral surface of the teeth portion 162 and the portion thereof covering the inner peripheral surface of the yoke portion 160. A terminal mounting portion 188 is integrally formed on an upper side end plate portion 187 covering the upper end surface of the yoke portion 160 of the bobbin 154. The terminal mounting portion 188 is formed on the central portion of the upper side end plate portion 187, and is equipped with a pair of right and left mounting recesses 190 having upper openings. The terminal mounting portion 188 may be called a "terminal mounting member".

A connection pin 192 protrudes from the left-hand end portion of the upper side end plate portion 187. Further, a connection member 194 having a connection hole 195 protrudes from the right end portion of the upper side end plate portion 187. Further, a lower side end plate portion 197 covering the lower end surface of the yoke portion 160 of the bobbin 154 has a connection pin 192 (indicated by the same reference numeral) and a connection member 194 (indicated by the same reference numeral) having a connection hole 195, which are in vertical symmetry with the connection pin 192 and the connection member 194 of the upper side end plate portion 187 (See FIG. 29). The upper and lower connection members 194 are formed so as to be capable of elastic deformation or deflecting deformation (See the dash-double-dot lines 194 in FIG. 29). The upper and lower connection pins 192 of the bobbin 154 arranged on the right-hand side and the connection holes 195 of the upper and lower connection members 194 of the bobbin 154 arranged on the left-hand side and adjacent thereto, can be engaged with each other by utilizing the deflecting deformation of the connection members 194. That is, the upper and lower pairs of connection pins 192 and connection members 194 constitute a connection device 175 allowing engagement by a snap-fit device.

(Fourth Step)

Figure 30:
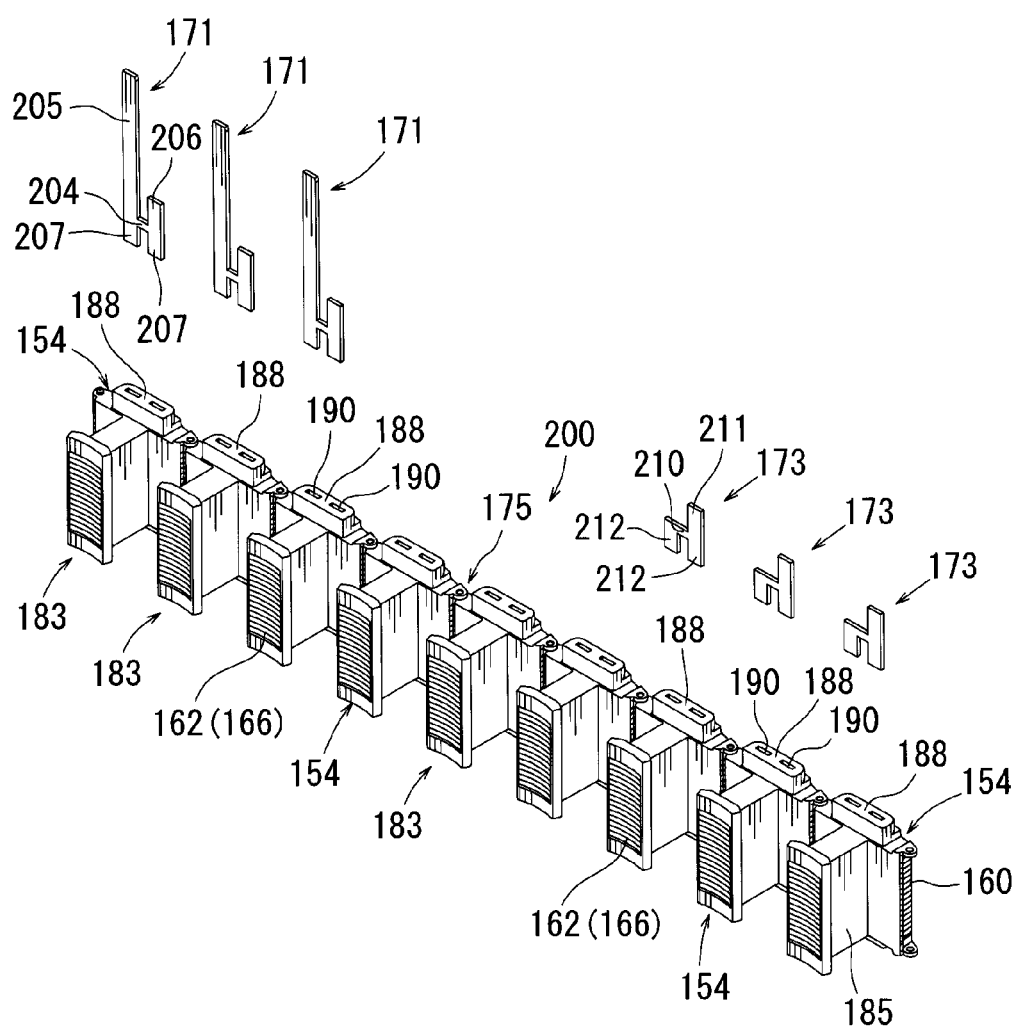
FIG. 30 is a perspective view showing the relationship between a first intermediate product row, external connection terminals, and neutral terminals.

In the fourth step, nine first intermediate products 183 are connected together in a planar fashion, that is, in a row. What is obtained through the connection of the nine intermediate products 183 is referred to as a first intermediate product row 200. FIG. 30 is a perspective view showing the relationship between the first intermediate product row 200 and external connection terminals 171 and the neutral terminals 173.

As shown in FIG. 30, in the bobbins 154 of first intermediate products 183 laterally adjacent to each other (See FIG. 29), the upper and lower connection pins 192 arranged on the right-hand side and the connection holes of the upper and lower connection members 194 arranged on the left-hand side so as to be adjacent thereto are engaged with each other by utilizing deflecting deformation of the connection members 194, whereby the bobbins 154 of the adjacent first intermediate products 183 are pivotally connected to each other. Similarly, the bobbins 154 of the nine first intermediate products 183 are connected together, whereby a first intermediate product row 200 is formed.

(Fifth Step)

Figure 31:
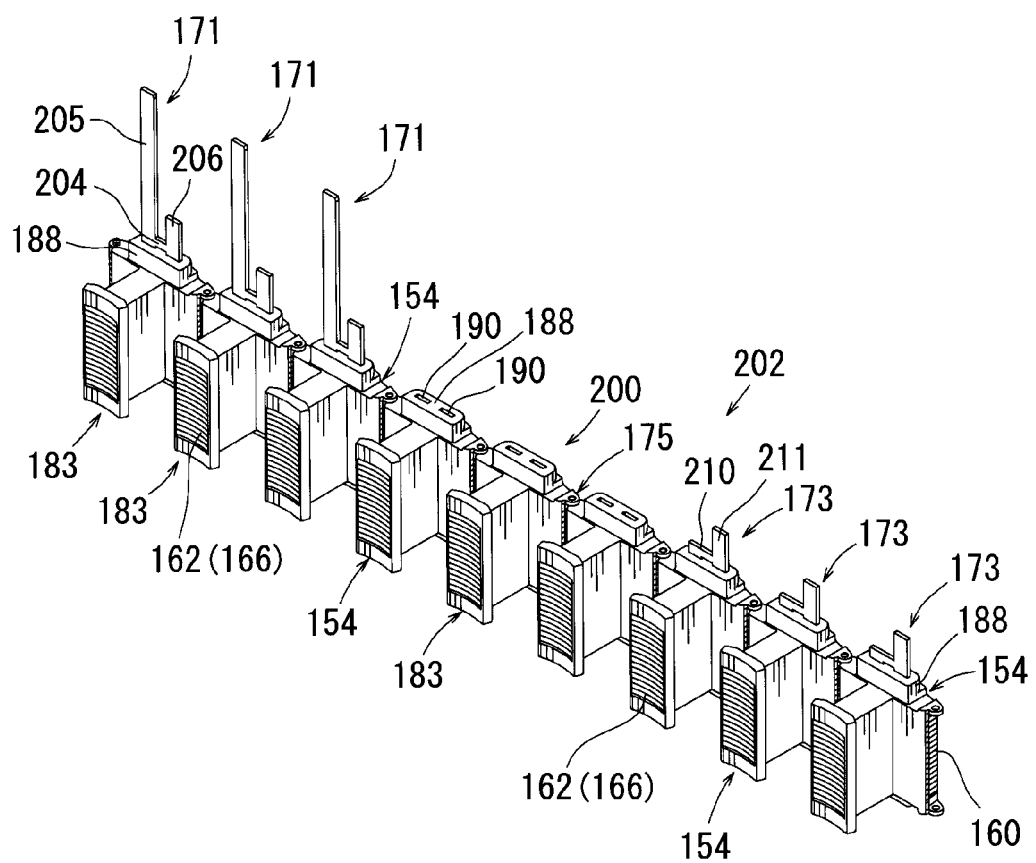
FIG. 31 is a perspective view of a second intermediate product.

In the fifth step, the external connection terminals 171 and the neutral terminals 173 are mounted to the first intermediate product row 200. What is obtained by mounting the external connection terminals 171 and the neutral terminals 173 to the first intermediate product row 200 is referred to as a second intermediate product 202. FIG. 31 is a perspective view of the second intermediate product, and FIG. 32 is a plan view of the same.

As shown in FIG. 30, the three external connection terminals 171 and the three neutral terminals 173 are previously formed. The external connection terminals 171 are previously formed by punching from a conductive material such as brass. Each external connection terminal 171 has a horizontally elongated rectangular base portion 204, a terminal portion 205 extending straight from one end portion of the base portion 204, an entwining portion 206 protruding from the other end portion of the base portion 204, and right and left leg portions 207 protruding from the lower side of the base portion 204. The terminal portion 205 and the left-hand side leg portion 207 are vertically aligned with each other, and the entwining portion 206 and the right-hand side leg portion 207 are vertically aligned with each other.

The neutral terminals 173 are previously formed by punching from a conductive material. Each neutral terminal 173 has a laterally elongated base portion 210, a terminal portion 211 protruding from one end portion of the base portion 210, and right and left leg portions 212 protruding from the lower side of the base portion 210. The terminal portion 211 and the right-hand side leg portion 212 are vertically aligned with each other.

Figure 32:
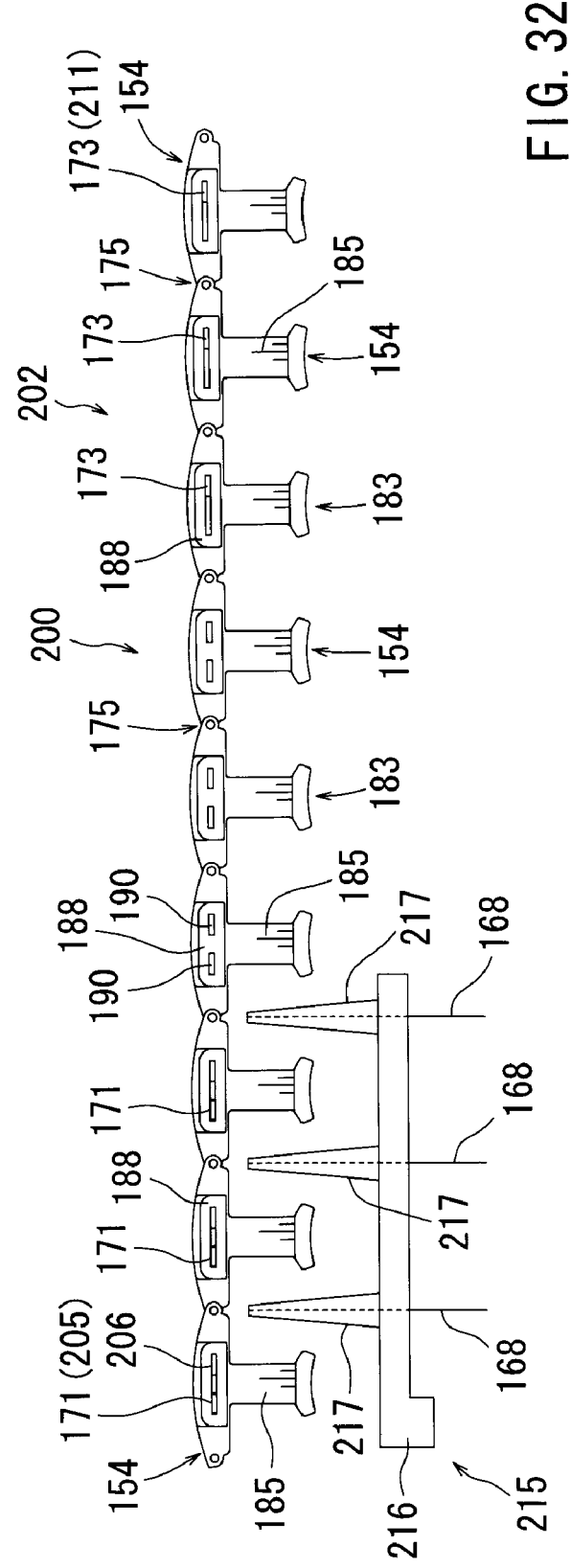
FIG. 32 is a plan view of the second intermediate product.

As shown in FIGS. 31 and 32, in the second intermediate product 202, the external connection terminals 171 are mounted to the first, second, and third bobbins 154 of the first intermediate product row 200 by press-fitting the leg portions 207 (See FIG. 30) into the mounting recesses 190 of the terminal mounting portions 188 (See FIG. 28). The neutral terminals 173 are mounted to the seventh, eighth, and ninth bobbins 154 of the first intermediate product row 200 by press-fitting the leg portions 212 (See FIG. 30) into the mounting recesses 190 of the terminal mounting portions 188 (See FIG. 28).

(Sixth Step)

In the sixth step, the magnet wires 168 are wound around the second intermediate product 202.

As shown in FIG. 32, a winding device 215 for winding the magnet wires 168 is equipped with a nozzle stand 216 capable of moving in a predetermined direction. The nozzle stand 217 is equipped with left-hand side, central, and right-hand side nozzles 217, i.e., three nozzles in total. The magnet wire 168 is fed out from each nozzle 217.

First, the start end portions of the magnet wires 168 drawn out of the nozzles 217 are respectively entwined around the entwining portions 206 of the external connection terminals 171. And, by rotating the nozzle stand 216 around the axis of the bobbin main portion 102 of each bobbin 154, the forward end portions of the nozzles 217 are swung along the bobbin main portions 185 of the first through third bobbins 154. As a result, the magnet wires 168 fed out from the nozzles 217 are respectively wound around the bobbin main portions 185 of the bobbins 154, whereby the first through third coils 156 are formed (See FIG. 24).

Next, the nozzle stand 216 is moved to a position where the nozzles 217 are opposed to three adjacent bobbins, i.e., the fourth through sixth bobbins 154. At this time, the nozzle stand 216 is moved such that the magnet wires 168 fed out from the nozzles 217 are hooked on the rear sides of the terminal mounting portions 188 of two bobbins 154. That is, the connection wire 169 extending between the first and fourth bobbins 154 is hooked on the rear sides of the terminal mounting portions 188 of the second and third bobbins 154. The connection wire 169 extending between the second and fifth bobbins 154 is hooked on the rear sides of the terminal mounting portions 188 of the third and fourth bobbins 154. The connection wire 169 extending between the third and sixth bobbins 154 is hooked on the rear sides of the terminal mounting portions 188 of the fourth and fifth bobbins 154.

And, by rotating the nozzle stand 216 again around the axis of each bobbin main portion 185, the forward end portions of the nozzles 217 are swung along the bobbin main portions 185 of the fourth through sixth bobbins 154. As a result, the magnet wires 168 fed out from the nozzles 217 are respectively wound around the bobbin main portions 185 of the bobbins 154, whereby the fourth through sixth coils 156 are formed (See FIG. 24).

Next, as in the case described above, the nozzle stand 216 is moved to a position where the nozzles 217 are opposed to three adjacent bobbins 154, that is, the seventh through ninth bobbins 154. At this time, the nozzle stand 216 is moved such that the magnet wires 168 fed out from the nozzles 217 are hooked on the rear sides of the terminal mounting portions 188 of two bobbins 154. That is, the connection wire 169 extending between the first and seventh bobbins 154 is hooked on the rear sides of the terminal mounting portions 188 of the fifth and sixth bobbins 154. The connection wire 169 extending between the fifth and eighth bobbins 154 is hooked on the rear sides of the terminal mounting portions 188 of the sixth and seventh bobbins 154. The connection wire 169 extending between the sixth and ninth bobbins 154 is hooked on the rear sides of the terminal mounting portions 188 of the seventh and eighth bobbins 154.

Next, by rotating the nozzle stand 216 around the axis of each bobbin main portion 185 again, the forward end portions of the nozzles 217 are swung along the bobbin main portions 185 of the seventh through ninth bobbins 154. As a result, the magnet wires 168 fed out from the nozzles 217 are respectively wound around the bobbin main portions 185 of the bobbins 154, whereby the seventh through ninth coils 156 are formed (See FIG. 24). And, the terminal end portion of each magnet wire 168 is entwined around the neutral terminal 173 of each of the bobbins 154 before being cut off. Opposite end portions of each magnet wire 168 are welded to the entwining portion 206 of each external connection terminal 171 and each neutral terminal 173 by resistance welding or the like.

In the manner described above, the end intermediate product 177 (See FIGS. 23 and 24) is formed.

(Seventh Step)

In the seventh step, the end intermediate product 177 is rounded.

The end intermediate product 177 (See FIGS. 23 and 24) is rounded into an annular configuration through pivoting at the connection units 175 of the bobbins 154. As a result, there is formed the stator 150 in which the core segments 158 are arranged in an annular fashion (See FIGS. 20 through 22). At this time, between the bobbins 154 at both ends of the first intermediate product row 200, the upper and lower connection pins 192 and the connection holes 195 of the upper and lower connection members 194 are engaged with each other by utilizing deflecting deformation of the connection members 194, whereby the upper and lower connection pins 192 and the upper and lower connection members 194 are engaged with each other, thereby connecting together the bobbins 154 adjacent to each other. Further, the protruding portions 160*a* and the recessed portions 160*b* of the yoke portions 160 of the adjacent core segments 158 are fitted with each other, whereby the side end surfaces of the yoke portions 160 are brought into face-to-face contact with each other. As a result, the contact area between the yoke portions 160 increases, and the magnetic circuit gap decreases.

Also in the stator 150 manufactured by the above-described manufacturing method, it is possible to obtain the same effect as that of Example 1.

Further, the connection pins 192 and the connection members 194 of the connection units 175 pivotally connecting the adjacent core segments 158 are formed integrally through resin molding with the core segments 158. Thus, the adjacent core segments 158 can be pivotally connected together by the connection pins 192 and the connection members 194 of the connection devices 175. Further, it is possible to integrally form the connection pins 192 and the connection members 194 of the connection devices 175 on the core segments 158 by a single resin molding process. Further, since the connection pins 192 and the connection members 194 of the connection devices 175 constitute snap-fit devices enabling engagement through utilization of the elastic deformation of resin, they easily allow connection.

Further, there is no need to separately provide pin members or the like as the connection units 175, so that it is possible to achieve reduction in cost. Further, due to the connection units 175 consisting of the connection pins 192 and the connection members 194 formed of resin, it is possible to round the end intermediate product 177 more easily as compared with Example 1, in which the core segment row 94 is rounded through bending at the thin-thickness portions 90.

As in Example 1, the stator 150 of this example can also be applied to a fuel pump by forming the upper body through resin molding.

Other Possible Modifications

The present invention is not limited to the above examples but allows various modifications. For example, the stator of a rotary electric motor of the present invention is not limited to a stator for a fuel pump but can be widely used as a stator for other devices. Further, the number of slots and the number of poles of the rotary electric motor are not limited to those of the above examples. Further, while in the fuel pump of the above examples, the pump section is formed by a Westco pump using an impeller, it is also possible to form the pump section by some other type of pump, such as a gear pump. Further, while in the above examples, an upper body formed through resin molding is assembled within a housing, it is also possible to adopt a construction in which the end wall portion of the upper body having a fuel discharge port and the stator are formed by separate members and assembled into the housing. Further, instead of being formed as a part of the bobbins, the terminal mounting members may be formed separately from the bobbins. Further, instead of being formed as a part of the bobbins, the connection wire retaining members may be formed separately from the bobbins.

What is claimed is:

1. A stator of a rotary electric motor, comprising:
   a plurality of core segments arranged in an annular fashion;
   a plurality of coils wound around the core segments via bobbins;
   a plurality of terminals connected to the coils; and
   a plurality of terminal mounting members to which the terminals are mounted;
   wherein the bobbin and the terminal mounting member for each of the core segments are molded by resin and integrated with the corresponding core segment;
   connection wire retaining members each retaining a connection wire between the coils for each phase during winding of the coils, wherein each of the connection wire retaining members is molded by resin and integrated with the corresponding core segment;
   wherein each connection wire retaining member includes a first side wall portion, a second side wall portion and an outer wall portion, the first side wall portion and the second side wall portions being disposed at right and left end edges of the corresponding core segment with respect to a circumferential direction of an annular of the annular fashion, and the outer wall portion being disposed on an outer peripheral side of the annular;
   wherein a retention groove is formed in the outer wall portion and extends in the circumferential direction;
   wherein a first guide groove is defined between the first side wall portion and the outer wall portion, and a second groove is defined between the second side wall portion and the outer wall portion;
   wherein each of the first and second guide grooves has a groove bottom portion at substantially the same level as the retention groove; and
   wherein the connection wire extends along the first guide groove of one of a pair of the core segments for each phase, the retention groove of at least one of the core segments positioned between the pair of the core segments, and the second guide groove of the other of the pair of the core segments.

2. The stator as in claim 1, further comprising at least one thin thickness portion connecting the adjacent core segments to each other prior to molding the bobbin and the terminal mounting member for each of the core segments, wherein the thin thickness portion has a thickness smaller than a thickness of the adjacent core segments in a radial direction with respect to the annular of the annular fashion, so that the thin thickness portion can be deformed.

3. The stator as in claim 2, wherein the coils are wound around the bobbins in a state in which the plurality of core segments are developed into a planar shape.

4. The stator as in claim 1, further comprising connection devices pivotally connecting the adjacent core segments to each other, wherein the connecting devices are molded by resin and integrated with the respective core segments.

5. The stator as in claim 4, wherein the coils are wound around bobbins in a state in which the plurality of core segments are developed into a planar shape.

6. A fuel pump comprising a rotary electric motor having a stator as in claim 1 and further comprising a pump mechanism driven by the rotary electric motor.

7. The stator as in claim 1, wherein:
the outer wall portion of each core segment includes a plurality of retention grooves, the number of which correspond to the number of phases, the retention grooves are formed at different levels from each other with respect to an axial direction of the annular of the annular fashion and extend parallel to each other;
the outer wall portion has an end surface in the axial direction; and
one of the core segments is configured to hold end portions of the connection wires and includes a plurality of vertical grooves each extending from the corresponding retention groove to the end face in the axial direction, so that the end portions of the connection wires extend in the axial direction along the vertical grooves from the corresponding retention grooves.

8. A method of manufacturing a stator of a rotary electric motor, comprising the steps of:
preparing a plurality of core segments;
molding bobbins by resin and integrating with the core segments, respectively;
molding terminal mounting members by resin simultaneously with molding any of the bobbins;
winding a plurality of coils around the core segments via the bobbins and connecting the coils to terminals;
mounting the terminals to the corresponding terminal mounting members; and
arranging the core segments in an annular fashion;
wherein the method further comprising retaining connection wires by connection wire retaining members during winding of the coils, so that each connection wire retaining member retains the corresponding connection wire between the coils for each phase, wherein each of the connection wire retaining members is molded by resin and integrated with the corresponding core segment;
wherein each connection wire retaining member includes a first side wall portion, a second side wall portion and an outer wall portion, the first side wall portion and the second side wall portions being disposed at right and left end edges of the corresponding core segment with respect to a circumferential direction of an annular of the annular fashion, and the outer wall portion being disposed on an outer peripheral side of the annular;
wherein a retention groove is formed in the outer wall portion and extends in the circumferential direction;
wherein a first guide groove is defined between the first side wall portion and the outer wall portion, and a second groove is defined between the second side wall portion and the outer wall portion;
wherein each of the first and second guide grooves has a groove bottom portion at substantially the same level as the retention groove; and
wherein the step of retaining connection wires by connection wire retaining members comprises extending the connection wire along the first guide groove of one of a pair of the core segments for each phase, the retention groove of at least one of the core segments positioned between the pair of the core segments, and the second guide groove of the other of the pair of the core segments.

9. The method as in claim 8, wherein the step of preparing the plurality of core segments comprises connecting the adjacent core segments to each other via at least one thin-thickness portion prior to molding the bobbins and terminal mounting members, wherein the thin thickness portion has a thickness smaller than a thickness of the adjacent core segments in a radial direction with respect to the annular of the annular fashion, so that the thin thickness portion can be deformed.

10. The method as in claim 9, wherein the step of winding the coils comprising winding the coils around the bobbins in a state in which the plurality of core segments are developed into a planar shape.

11. The method as in claim 8, wherein the step of preparing the plurality of core segments comprises molding connection devices by resin and integrating with the adjacent core segments, respectively, the connection devices pivotally connecting the adjacent core segments to each other.

12. The method as in claim 11, wherein the step of winding the coils comprising winding the coils around the bobbins in a state in which the plurality of core segments are developed into a planar shape.

13. A stator of a rotary electric motor manufactured by a method as in claim 8.

14. A fuel pump comprising a rotary electric motor having a stator as in claim 13 and further comprising a pump mechanism driven by the rotary electric motor.

15. The method as in claim 8, wherein:
the outer wall portion of each core segment includes a plurality of retention grooves, the number of which correspond to the number of phases, the retention grooves are formed at different levels from each other with respect to an axial direction of the annular of the annular fashion and extend parallel to each other;
the outer wall portion has an end surface in the axial direction; and
one of the core segments is configured to hold end portions of the connection wires and includes a plurality of vertical grooves each extending from the corresponding retention groove to the end face in the axial direction, and
the method further comprising extending the end portions of the connection wires in the axial direction along the vertical grooves from the corresponding retention grooves.

* * * * *